US00RE50723E

(19) United States
(12) Reissued Patent
Hong et al.

(10) Patent Number: US RE50,723 E
(45) Date of Reissued Patent: Dec. 30, 2025

(54) BUFFER STATE REPORT TRANSMISSION METHOD AND DEVICE THEREFOR

(71) Applicant: KT CORPORATION, Seongnam-si (KR)

(72) Inventors: Sung-Pyo Hong, Seoul (KR); Woo-Jin Choi, Seoul (KR)

(73) Assignee: PEGASUS WIRELESS INNOVATION LLC, Ashburn, VA (US)

(21) Appl. No.: 18/136,835

(22) Filed: Apr. 19, 2023

Related U.S. Patent Documents

Reissue of:
(64) Patent No.: 10,986,530
Issued: Apr. 20, 2021
Appl. No.: 16/349,259
PCT Filed: Mar. 8, 2018
PCT No.: PCT/KR2018/002750
§ 371 (c)(1),
(2) Date: May 10, 2019
PCT Pub. No.: WO2018/164499
PCT Pub. Date: Sep. 13, 2018

(30) Foreign Application Priority Data

Mar. 10, 2017 (KR) ..... 10-2017-0030764
May 31, 2017 (KR) ..... 10-2017-0068074
(Continued)

(51) Int. Cl.
*H04W 76/15* (2018.01)
*H04W 4/70* (2018.01)
(Continued)

(52) U.S. Cl.
CPC ..... *H04W 76/15* (2018.02); *H04W 4/70* (2018.02); *H04W 28/0278* (2013.01); *H04W 40/04* (2013.01)

(58) Field of Classification Search
CPC . H04W 76/15; H04W 28/0278; H04W 40/04; H04W 4/70
See application file for complete search history.

(56) References Cited

U.S. PATENT DOCUMENTS

2012/0140743 A1* 6/2012 Pelletier ..... H04W 76/15 370/335
2015/0181479 A1 6/2015 Lin et al.
(Continued)

FOREIGN PATENT DOCUMENTS

KR 10-2015-0034588 A 4/2015
WO 2015/016646 A1 2/2015
WO 2015/020461 A1 2/2015

OTHER PUBLICATIONS

"3GPP TS 36.321 V13.7.0" (Year: 2017).*
(Continued)

*Primary Examiner* — Matthew E Heneghan
(74) *Attorney, Agent, or Firm* — INVENSTONE PATENT, LLC

(57) ABSTRACT

Provided are methods and apparatuses for transmitting a buffer status report in carrier aggregation environment. The method may include receiving, from a base station, high layer signaling including information for configuring data duplicate transmission using carrier aggregation, configuring a plurality of radio link control (RLC) entities including a first RLC entity and a second RLC entity associated with one packet data convergence protocol (PDCP) entity based on the high layer signaling, and configuring a logical channel associated with the first RLC entity and a logical channel associated with the second RLC entity to one medium access control (MAC) entity; and when the data duplicate transmission is activated, transmitting, to the base station, the buffer status report including PDCP data volume in both a logical channel group associated with the first RLC entity
(Continued)

and a logical channel group associated with the second RLC entity.

17 Claims, 19 Drawing Sheets

(30) Foreign Application Priority Data

Nov. 15, 2017 (KR) ..... 10-2017-0152149
Mar. 7, 2018 (KR) ..... 10-2018-0026611

(51) Int. Cl.
*H04W 28/02* (2009.01)
*H04W 40/04* (2009.01)

(56) References Cited

U.S. PATENT DOCUMENTS

2016/0143078 A1 5/2016 Jeong
2016/0242193 A1 8/2016 Hong et al.
2016/0337895 A1 11/2016 Lee et al.
2017/0331577 A1* 11/2017 Parkvall ..... H04J 11/0079
2018/0332644 A1 11/2018 Jeong

OTHER PUBLICATIONS

3GPP TS36.321 (Year: 2017).*

Non-final Office Action mailed Jun. 12, 2020 for U.S. Appl. No. 16/349,259.

Notice of Allowance mailed Dec. 28, 2020 for U.S. Appl. No. 16/349,259.

Ericsson, "Data duplication in lower layers (HARQ)", Tdoc R2-1702032, 3GPP TSG-RAN WG2 #97, Athens, Greece, Feb. 13-17, 2017, pp. 1-6.

* cited by examiner

*FIG. 9*

RLC configuration information

```
DRB-ToAddMod ::=            SEQUENCE {
    eps-BearerIdentity                      INTEGER (0..15)             OPTIONAL,
    drb-Identity                            DRB-Identity,
    pdcp-Config                             PDCP-Config                 OPTIONAL,
    rlc-Config                              RLC-Config                  OPTIONAL,
    rlc-ConfigDuplicate                     RLC-Config                  OPTIONAL,
    logicalChannelIdentity                  INTEGER (3..10)             OPTIONAL,
    logicalChannelConfig                    LogicalChannelConfig        OPTIONAL,
    logicalChannelIdentityDuplicate         INTEGER (3..10)             OPTIONAL,
    logicalChannelConfigDuplicate           LogicalChannelConfig        OPTIONAL,

}
```

*FIG.10*

RLC configuration information

```
DRB-ToAddModDupplicate ::=          SEQUENCE {
    drb-Identity                        DRB-Identity,
    rlc-ConfigDuplicate                 RLC-Config                  OPTIONAL,
    logicalChannelIdentityDuplicate     INTEGER (3..10)             OPTIONAL,
    logicalChannelConfigDuplicate       LogicalChannelConfig        OPTIONAL,

}
```

FIG. 11

RLC configuration information

```
DRB-ToAddMod ::=            SEQUENCE {
    eps-BearerIdentity                  INTEGER (0..15)             OPTIONAL,
    drb-Identity                        DRB-Identity,
    pdcp-Config                         PDCP-Config                 OPTIONAL,
    rlc-Configuration       ::= SEQUENCE {
            rlcIdentity                 INTEGER (0..N)              OPTIONAL,
            rlc-Config                  RLC-Config                  OPTIONAL,
    }
    Logical-channelConfiguration ::= SEQUENCE {
            logicalChannelIdentity      INTEGER (3..10)             OPTIONAL,
            logicalChannelConfig        LogicalChannelConfig        OPTIONAL,
    }
}
```

FIG.12

RLC configuration information

```
DRB-ToAddMod ::=      SEQUENCE {
      eps-BearerIdentity                    INTEGER (0..15)          OPTIONAL,
      drb-Identity                          DRB-Identity,
      pdcp-Config                           PDCP-Config              OPTIONAL,
      rlc-Configuration          ::=  SEQUENCE {
                rlcIdentity                 INTEGER (0..N)           OPTIONAL,
                rlc-Config                  RLC-Config               OPTIONAL,
    }
    Logical-channelConfiguration ::=      SEQUENCE {
                logicalChannelIdentity      INTEGER (3..10)          OPTIONAL,
                logicalChannelConfig        LogicalChannelConfig     OPTIONAL,
                rlcIdentity                 INTEGER (0..N)           OPTIONAL,
    }
}
```

FIG.13

RLC configuration information

```
DRB-ToAddMod ::=            SEQUENCE {
    eps-BearerIdentity                  INTEGER (0..15)             OPTIONAL,
    drb-Identity                        DRB-Identity,
    pdcp-Config                         PDCP-Config                 OPTIONAL,
    rlc-Configuration  ::=      SEQUENCE {
            rlcIdentity                 INTEGER (0..N)              OPTIONAL,
            rlc-Config                  RLC-Config                  OPTIONAL,
            logicalChannelIdentity      INTEGER (3..10)             OPTIONAL,
    }
    Logical-channelConfiguration ::=    SEQUENCE {
            logicalChannelIdentity      INTEGER (3..10)             OPTIONAL,
            logicalChannelConfig        LogicalChannelConfig        OPTIONAL,
    }
}
```

Short BSR/Truncated BSR MAC Control element format

Long BSR MAC Control element format

FIG. 16

Radio bearer configuration information

```
RadioBearerConfig ::= SEQUENCE {
    srb-ToAddModList                                    SRB-ToAddModList
    srb-ToReleaseList                                   INTEGER (3),
    drb-ToAddModList                                    DRB-ToAddModList
    drb-ToReleaseList                                   DRB-ToReleaseList
    securityConfig                                      SecurityConfig
}

SRB-ToAddMod ::=  SEQUENCE {
    srb-Identity                                        SRB-Identity,
    pdcp-Config                                         PDCP-Config,
    ...
}

DRB-ToAddMod ::=  SEQUENCE {
    cnAssociation                           CHOICE {
                eps-BearerIdentity                      INTEGER (0..15),
                sdap-Config                             SDAP-Config,
                }
    drb-Identity                                        DRB-Identity,
    pdcp-Config                                         PDCP-Config,
}

SecurityConfig ::=  SEQUENCE {
    securityAlgorithmConfig                             SecurityAlgorithmConfig,
    keyToUse                                            ENUMERATED{KeNB, sKgNB},
    ...
}
```

FIG.17

Cell group configuration information

```
CellGroupConfig::= SEQUENCE {
    cellGroupId                     CellGroupId,
    -- Logical Channel configuration and association with radio bearers:
    logicalChannel-ToAddModList     SEQUENCE (SIZE(1..maxLCH)) OF LCH-Config
    logicalChannel-ToReleaseList    SEQUENCE (SIZE(1..maxLCH)) OF LogicalChannelIdentity,
    -- Parameters applicable for the entire cell group:
    mac-CellGroupConfig                             MAC-CellGroupConfig,
    rlf-TimersAndConstants                          RLF-TimersAndConstants,
    -- Serving Cell specific parameters (PCell and SCells)
    pCellConfig                     PCellConfig,
    sCellToAddModList                               SCellToAddModList,
    sCellToReleaseList                              SCellToReleaseList,
}

CellGroupId ::=  INTEGER (1.. maxSCellGroups)
-- Configuration of one logical channel:
LCH-Config ::=  SEQUENCE {
    logicalChannelIdentity                          LogicalChannelIdentity,
    -- Associate the logical channel with an SRB or a DRB:
    servedRadioBearer ::=                           CHOICE {
                srb-Association                     SRB-Identity,
                drb-Association                     DRB-Identity
                }
```

BUFFER STATE REPORT TRANSMISSION METHOD AND DEVICE THEREFOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a reissue application of U.S. Pat. No. 10,986,530 issued on Apr. 20, 2021, which is issued from U.S. patent application Ser. No. 16/349,259, filed on May 10, 2019, which* is a National Stage Patent Application of PCT International Patent Application No. PCT/KR2018/002750 (filed on Mar. 8, 2018) under 35 U.S.C. § 371, which claims priority to Korean Patent Application Nos. 10-2017-0030764 (filed on Mar. 10, 2017), 10-2017-0068074 (filed on May 31, 2017), 10-2017-0152149 (filed on Nov. 15, 2017), and 10-2018-0026611 (filed on Mar. 7, 2018), the [teachings] *disclosures* of which are incorporated herein in their entireties by reference.

TECHNICAL FIELD

The present disclosure relates to methods for enabling a user equipment to be configured with carrier aggregation based on a single base station, to transmit data in duplicate, and to transmit a corresponding buffer status report in next generation mobile communication network (NR).

More specifically, the present disclosure relates to methods and devices for enabling the user equipment to be configured with carrier aggregation based on a single base station and to perform duplicate transmission of user plane data or control plane data, and methods and devices for enabling the user equipment to transmit the buffer status report using the carrier aggregation based on the single base station.

BACKGROUND ART

Due to advances in communication systems, various types of wireless terminals have been introduced to consumers such as companies and individuals.

Mobile communication systems employing technologies related to 3rd generation partnership project (3GPP), such as Long Term Evolution (LTE), LTE-Advanced, fifth generation (5G), or the like, have been designed for transmitting and receiving a large amount of various data, such as video data, radio data, or the like, at a high-speed.

After LTE-Advanced, technologies for next generation radio access networks have been developed for enabling a user equipment to transmit and receive even more data and provide higher Quality of Service (QoS). For example, 3GPP have developed 5G network technologies.

Meanwhile, it is possible for a base station to increase the data transmit rate and capability of a user equipment by configuring and using a plurality of cells. For example, the base station and the user equipment may meet user's requirements using carrier aggregation configured based on a plurality of carriers.

In particular, in order to provide reliably a service with low latency, such as ultra-reliable and low-latency communications (URLLC), it is necessary for data to be transmitted/received without loss at an even higher speed. To this end, a technology is required for transmitting data in duplicate using a plurality of cells and even securing reliability to the related service.

However, until now, no method or related technology has been proposed or developed for enabling a user equipment to perform the duplicate transmission of data through one radio bearer. Accordingly, it is not easy to satisfy requirements of the URLLC service that is one of key usage scenarios of 5G mobile communication technology.

DETAILED DESCRIPTION OF THE INVENTION

Technical Problem

In accordance with embodiments of the present disclosure, a method and a device or system are provided for enabling a user equipment to be configured with carrier aggregation using a plurality of cells and to perform duplicate transmission of data through the carrier aggregated cells.

In addition, in accordance with embodiments of the present disclosure, a technology is provided for enabling the user equipment configured with the duplicate transmission to transmit a buffer status report.

Technical Solution

In accordance with an aspect of the present disclosure to address the above issues, a method of a user equipment configured with carrier aggregation is provided for transmitting a buffer status report. The method includes: receiving high layer signaling including information for configuring data duplicate transmission using the carrier aggregation from a base station, configuring a plurality of RLC entities including a first radio link control (RLC) entity and a second RLC entity associated with one packet data convergence protocol (PDCP) entity based on the high layer signaling and configuring a logical channel associated with the first RLC entity and a logical channel associated with the second RLC entity, to one medium access control (MAC) entity, and when the data duplicate transmission is activated, transmitting, to the base station, the buffer status report configured by including PDCP data volume in both a logical channel group associated with the first RLC entity and a logical channel group associated with the second RLC entity.

In accordance with another aspect of the present disclosure, a method of a base station configuring carrier aggregation to a user equipment is provided for receiving a buffer status report. The method includes: generating information for configuring data duplicate transmission using the carrier aggregation, transmitting high layer signaling including the information for configuring the data duplicate transmission using the carrier aggregation to the user equipment, and when the data duplicate transmission is activated, receiving, from the user equipment, the buffer status report configured by including PDCP data volume in both a logical channel group associated with the first RLC entity of the user equipment and a logical channel group associated with the second RLC entity of the user equipment.

In accordance with still another aspect of the present disclosure, a user equipment configured with carrier aggregation is provided for transmitting a buffer status report. The user equipment includes: a receiver configured to receive high layer signaling including information for configuring data duplicate transmission using the carrier aggregation from a base station, a controller configured to configure a plurality of RLC entities including a first radio link control (RLC) entity and a second RLC entity associated with one packet data convergence protocol (PDCP) entity based on the high layer signaling and configuring a logical channel associated with the first RLC entity and a logical channel associated with the second RLC entity, to one medium access control (MAC) entity, and when data duplicate transmission is activated, a transmitter configured to transmit, to the base station, the buffer status report configured by including PDCP data volume in both a logical channel group associated with the first RLC entity and a logical channel group associated with the second RLC entity.

In accordance with yet another aspect of the present disclosure, a base station configuring carrier aggregation to a user equipment is provided for receiving a buffer status report. The base station includes: a controller configured to generate information for configuring data duplicate transmission using the carrier aggregation, a transmitter configured to transmit high layer signaling including the information for configuring the data duplicate transmission using the carrier aggregation to the user equipment, and when the data duplicate transmission is activated, a receiver configured to receive, from the user equipment, the buffer status report configured by including PDCP data volume in both a logical channel group associated with the first RLC entity of the user equipment and a logical channel group associated with the second RLC entity of the user equipment.

Effects of the Invention

In accordance with embodiments of the present disclosure, a user equipment and a base station accurately transmit/receive data at high speed for providing reliable services with low latency. A method is provided for individually processing data transmitted/received in duplicate for each logical channel.

In addition, in accordance with embodiments of the present disclosure, a user equipment supporting duplicate transmission transmits a buffer status report accurately to a base station.

BRIEF DESCRIPTION OF THE DRAWINGS

FIG. 9 is a diagram illustrating RLC configuration information according to an embodiment of the present disclosure.

FIG. 10 is a diagram illustrating RLC configuration information according to another embodiment of the present disclosure.

FIG. 11 is a diagram illustrating RLC configuration information according to still another embodiment of the present disclosure.

FIG. 12 is a diagram illustrating RLC configuration information according to further another embodiment of the present disclosure.

FIG. 13 is a diagram illustrating RLC configuration information according to yet another embodiment of the present disclosure.

FIG. 16 is a diagram illustrating radio bearer configuration information according to embodiments of the present disclosure.

FIG. 17 is a diagram illustrating cell group configuration information according to embodiments of the present disclosure.

BEST MODE FOR CARRYING OUT THE INVENTION

Figure 1:
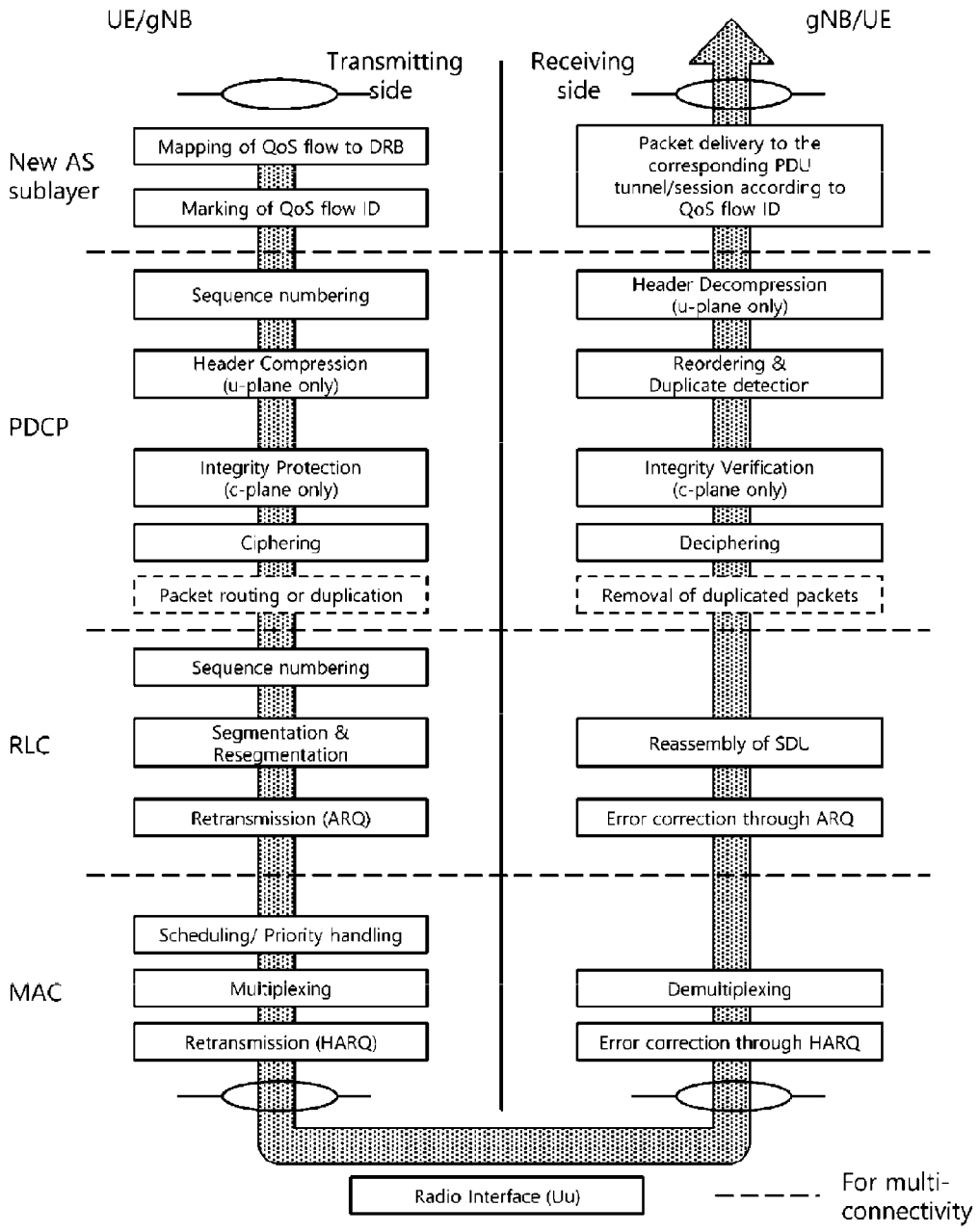
FIG. 1 is a diagram illustrating a layer 2 structure for new radio access technology (New RAT).

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a machine type communication (MTC) terminal may refer to a terminal supporting low cost (or low complexity), a terminal supporting coverage enhancement, or the like. In the present disclosure, the MTC terminal may refer to a terminal supporting low cost (or low complexity), a terminal supporting coverage enhancement, and the like. In addition, in the present disclosure, the MTC terminal may refer to a terminal classified into a specific category for supporting low cost (or low complexity) and/or coverage enhancement.

In other words, the MTC terminal may refer to a low cost (or low complexity) user equipment category/type newly defined in 3GPP Release-13 and performing LTE-based MTC-related operations. The MTC terminal may refer to a user equipment category/type defined in or before 3GPP Release-12, which supports enhanced coverage in comparison with the typical LTE coverage or supports low power consumption. Or, the MTC device may refer to a low cost (or low complexity) user equipment category/type newly defined in Release-13.

In the present disclosure, a wireless communication system is widely deployed to provide various communication services, such as a voice communication service, a packet data service, etc. The wireless communication system includes a user equipment (Hereinafter, referred to as "UE") and a base station (BS, or eNB). In the present disclosure, the UE is defined as a generic term referring to terminals used in wireless communication. For example, the UE may be referred to, but not limited to, i) a UE supporting wideband code division multiple access (WCDMA), long term evolution (LTE), high speed packet access (HSPA), international mobile telecommunications (IMT)-2020 (5G or new radio), or the like, ii) a mobile station (MS) supporting the global system for mobile communication (GSM), iii) a user terminal (UT), iv) a subscriber station (SS), v) a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

That is, the base station or the cell is defined as a generic term including, but not limited to, as well as some areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Each of the various cells is controlled by a base station. Therefore, the base station may be classified into two categories. The base station may be referred to 1) an apparatus that forms a corresponding communication service area, such as a megacell, a macrocell, a microcell, a picocell, a femtocell, or a small cell, and provides a communication service within the corresponding communication service area, or 2) a communication service area. In the case of 1), the base station may be referred to i) apparatuses that are controlled by the same entity for forming the corresponding communication service area and providing the communication service within the corresponding communication service, or ii) apparatuses that interact and cooperate with each other for forming the corresponding communication service area and providing the communication service within the corresponding communication service. According to communication schemes employed by a base station, the base station may be referred to as an eNB, a RRH, an antenna, a RU, a low power node (LPN), a point, a transmission/reception point, a transmission point, a reception point, or the like. In the case of 2), the base station may be a communication service area itself where UEs able to receive signals from or transmit signals to other UEs and neighboring base stations.

Accordingly, the base station is defined as a generic term collectively including the megacell, the macrocell, the microcell, the picocell, the femtocell, or the small cell, the RRH, the antenna, the RU, the LPN, the point, the eNB, the transmission/reception point, the transmission point, or the reception point.

In the present disclosure, the UE and the base station are two entities for performing transmission/reception used to embody the technology and technical spirit described in the present specification. The UE and the base station are defined as a generic term and not limited to specific terms or words. The UE and the base station are two entities for performing uplink or downlink transmission/reception used to embody the technology and technical spirit described in the present disclosure. The UE and the base station are defined as a generic term and not limited to specific terms or words. Herein, the uplink (hereinafter, referred to as "UL") refers to data transmission/reception by a UE to/from a base station, and the downlink (hereinafter, referred to as "DL") refers to data transmission/reception by a base station to/from a UE.

Any of multiple access techniques may be applied to the wireless communication system. For example, the wireless communication system may employ various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. An embodiment of the present disclosure may be applied to resource allocation in as well as asynchronous wireless communication evolving into LTE/LTE-advanced and IMT-2020 beyond GSM, WCDMA, and HSPA, synchronous wireless communication evolving into CDMA, CDMA-2000, and UMB. The present disclosure is not construed to be limited to or limited to a particular wireless communication field and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, under the related standard, in some systems such as the LTE system or the LTE-advanced system, the UL and the DL are configured based on a single carrier or a pair of carriers. For transmitting/receiving control information, the UL and the DL may be configured with one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. For transmitting/receiving data, the UL and the DL may be configured with one or more data channels, such as a physical DL shared channel (PDSCH), a physical UL shared channel (PUSCH), or the like.

Meanwhile, the control information may be transmitted through the EPDCCH (enhanced PDCCH or extended PDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system to which at least one embodiment is applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be a base station or macrocell (hereinafter, referred to as 'eNB') and at least one remote radio head (RRH) that is connected to the eNB through an optical cable or an optical fiber and thereby controlled in a wired manner, and that has high transmission power or low transmission power in the macrocell area.

Hereinafter, the DL denotes communication or a communication path from multiple transmission/reception points to a UE, or the UL denotes communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, transmission/reception of a signal through a channel such as the PUCCH, the PUSCH, the PDCCH, or the PDSCH, may be described as transmission/reception of the signal, such as the PUCCH, the PUSCH, the PDCCH, or the PDSCH.

In addition, hereinafter, a description of transmitting or receiving a PDCCH or a description of transmitting or receiving a signal through the PDCCH may include meaning of transmitting or receiving an EPDCCH or transmitting or receiving a signal through the EPDCCH.

That is, a physical DL control channel described below may mean one of the PDCCH and the EPDCCH, or both of the PDCCH and the EPDCCH.

Also, for convenience of description and ease of understanding, an EPDCCH may be applied to an embodiment described with the PDCCH, as an embodiment of the present disclosure, and the PDCCH may be also applied to an embodiment described with the EPDCCH as an embodiment.

Meanwhile, higher layer signaling described below includes radio resource control (RRC) signaling transmitting RRC information containing an RRC parameter.

The eNB performs DL transmission to UEs. The eNB may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmitting/receiving a signal through each channel may be described in such a manner that a corresponding channel is transmitted/received.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a subframe, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

For example, in the present disclosure, the LTE and the NR denote different radio access technologies, and the term "NR" as used herein refers to a new radio access technology under discussion in Release-15 of the 3GPP. The NR may include various differences compared with the LTE, such as a different frame structure, channel, core network technology, or the like, and may additionally include wireless transmission in a high band, transmission of a large volume of data or transmission of data in high speed.

Hereinafter, for convenience of description and ease of understanding, a typical radio access technology is referred to as the LTE, and the new radio access technology under discussion in the 3GPP is referred to as the NR. A base station may be an eNB employing the LTE technology or a gNB employing the NR technology. The eNB and the gNB are distinguished from each other for describing embodiments and examples of the present disclosure, if necessary.

A cell is used as a generic term including, but not limited to, a radio path, a radio link, a carrier, or the like, for transmitting data, and one base station may transmit/receive data using a plurality of cells. A UE may transmit/receive data using a plurality of cells through each cell controlled by each of two base stations. As described below, the using of a plurality of cells controlled by one base station is described as carrier aggregation, and the using of a plurality of cells controlled by two or more base stations is described as dual connectivity.

LTE Dual Connectivity Operation

The typical LTE technology supports dual connectivity for a UE to simultaneously use radio resources of two base stations. A dual connectivity operation enables a multiple RX/TX UE in an RRC connected state to use radio resources which are connected to two base stations connected through non-ideal backhaul and which are provided by two different schedulers located in each base station.

In case the dual connectivity is configured, a UE may transmit/receive data through a plurality of cells provided by a plurality of base stations. Hereinafter, a primary base station is referred to as a Master eNB (MeNB), and an additional base station is referred to as a secondary eNB (SeNB).

To provide a radio resource of a SeNB to a UE, a SeNB addition procedure is used at the SeNB for establishing a UE context.

NR (New Radio)

Recently, the 3GPP has carried out a "Study on New Radio Access Technology" (hereinafter, for convenience of description, referred to as a new radio (NR)). The NR provides a new AS sublayer over PDCP for providing flow-based QoS.

FIG. 1 is a diagram illustrating a layer 2 structure for a new radio access technology (New RAT).

As shown in FIG. 1, key services and functions of the new AS sublayer are as follows.

Mapping between a QoS flow and a data radio bearer; Marking QoS flow ID in both DL and UL packets.

In addition, the new user plane protocol layer is applicable for connections to a next generation core (NextGen Core). A single protocol entity of the new user plane protocol layer is configured for each individual PDU session.

For architecture for the NR and a requirement for migration, it is necessary for RAN architecture to support tight interworking between the NR and the LTE. LTE dual connectivity is expected to be reused for the tight interworking between the NR and the LTE. Furthermore, the dual connectivity technology may be used between NR base stations in the NR. Dual connectivity in the NR environment may be defined as multi-connectivity. For example, the multi-connectivity may be defined as an operation mode of a UE for using radio resources configured by an LTE base station and/or an NR base station (Multi-Connectivity: Mode of operation whereby a multiple Rx/Tx UE in the connected mode is configured to utilize radio resources amongst E-UTRA and/or NR provided by multiple distinct schedulers connected via non-ideal backhaul.)

Meanwhile, the NR may be deployed even in a high frequency band (e.g., a high frequency of 6 GHz or more). In this case, there may occur sharp SINR drops depending on link blockage and high transmission loss in the high frequency band. This may result in unnecessary latency and reduced reliability, when an NR base station transmits control plane RRC messages or user plane data through an interface between the NR and an NR UE. In particular, such a problem makes it difficult to provide services such as the URLLC.

As an example of solving such a problem, to provide RRC diversity, control plane RRC messages may be transmitted in duplicate through one or more radio paths. As another example, user plane data may be transmitted in duplicate based on multi-connectivity through one or more radio paths.

Duplicate Transmission Based on a Single Base Station

In order to increase transmission rate and transmission throughput of data, it is necessary to provide carrier aggregation (Hereinafter, referred to as "CA") in the NR. For example, a UE may transmit data through a plurality of cells based on the CA deployed by a single base station. Hereinafter, the cell described below may be used in combination with a radio path, a radio link, a carrier, or the like, if necessary. As described above, in the present disclosure, the terms of the radio path, the radio link, the carrier, the cell, and the like, denote a data path provided for transmitting/receiving by a base station data to/from a UE.

When CA is provided by a single base station, a UE may perform duplicate transmission or data duplicate through one or more cells. For example, duplicate transmission of control plane RRC messages may be performed through one or more cells. As another example, duplicate transmission of user plane data may be performed through one or more cells. However, no procedures and technical details have been provided for performing duplicate transmission using the CA.

As described above, in a radio access network, as a method for reliably providing a service such as the URLLC with low latency, duplicate transmission may be performed through two or more radio paths into the NR. However, when CA is configured for a UE based on a single base station, no support has been provided for duplicate transmission or data duplicate through two radio paths using the CA.

Furthermore, when the CA is configured for the UE based on the single base station, no procedures and methods have been provided for transmitting by the UE a buffer status report to the base station.

To address such issues, in accordance with embodiments of the present disclosure, when CA is deployed based on a single base station, a method and apparatus of a UE and the base station are provided for effectively processing services such as the URLLC, in accordance with embodiments of the present disclosure. Further, a method is provided for effectively controlling a plurality of cells based on the CA.

Further, a technology is provided for transmitting a buffer status report when CA is configured for a UE based on a single base station.

Embodiments of the present disclosure may be applied to, as well as next generation mobile communication (for example, 5G mobile communication/NR) UEs, any radio access (e.g., the LTE) networks and UEs.

For convenience of description and ease of understanding, the base station may denote an eNodeB of LTE/E-UTRAN or an LTE base station, or denote at least one of an NR node, a central unit (CU), a distribute unit (DU), a gNodeB in which the CU and the DU form one logical entity, or an NR base station. Hereinafter, for convenience of description and ease of understanding, an NR base station is described, but all entities described above may be included in the scope of the present disclosure.

Following scenarios may be considered in NR-LTE.

In case CA is deployed based on one or more NR cells and one or more LTE cells provided through an LTE base station In case CA is deployed based on one or more NR cells and one or more LTE cells provided through an NR base station In case CA is deployed based on one or more NR cells provided through an NR base station In case CA is deployed based on one or more LTE cells provided through an LTE base station Hereinafter, for convenience of description and ease of understanding, embodiments will be described based on a case where CA is deployed based on one or more NE cells provided by an NR base station. This scenario is just for convenience of description and ease of understanding, and therefore other scenarios are included in the scope of the present disclosure. Further, embodiments of the present disclosure include a case where dual connectivity is configured for a UE while CA is used, based on one or more LTE cells provided by an LTE base station and one or more NR cells provided by an NR base station. For example, embodiments of the present disclosure may include a case where duplicate transmission is performed using CA deployed by following one or more base stations, while one type of dual connectivity is configured among i) LTE-NR dual connectivity in which an LTE base station is a master base station and an NR base station is a secondary base station, ii) NR-LTE dual connectivity in which an NR base station is a master base station and an LTE base station is a secondary base station, or iii) NR-NR dual connectivity in which an NR base station is a master base station and another NR base station is a secondary base station. That is, embodiments of the present disclosure may include, while a plurality of base stations each employing different radio access technologies from another or a plurality of NR base stations is configured to perform dual connectivity, a case where CA is configured by a single base station which is one of the base stations and the NR base stations.

The NR base station may control an NR radio resource of a UE. The NR base station may perform one or more control functions among addition/modification/release/management of an NR cell/cell group/transmission point/transmission point group/transmission/reception point/transmission/reception point group/TRP/antenna/antenna group/beam (hereinafter, referred to as cell), NR measurement, NR measurement reporting, NR resource allocation, addition/correction/release of an NR radio bearer, NR radio resource configuration, and NR mobility control. The NR base station may indicate one or more control functions described above to a UE through an RRC configuration or a reconfiguration message.

The NR base station may configure CA for a UE through one or more cells.

The NR base station may perform data duplicate transmission based on CA using a PDCP duplicate function.

A PDCP entity of the base station duplicates or copies PDCP PDUs (or PDCP SDUs) having an identical sequence number (SN) for transmitting data in duplicate through one or more radio cells, and then submits the duplicated or copied PDCP PDUs (or PDCP SDUs) to a lower layer(s).

A PDCP entity of the UE receives the PDCP PDUs (or PDCP SDUs) received through one or more radio cells. For example, the PDCP entity may process data received first and discard duplicate data. As another example, the function of detecting and discarding duplicate data may be performed by the PDCP entity. For example, a transmitting side may transmit data having an identical PDCP SN through two paths, and a receiving side may detect the duplicate data based on the PDCP SN (or discard the detected data after detecting). The base station may transmit configuration information for indicating or processing such an operation to the UE.

For UL transmission, a PDCP entity of the UE duplicates or copies PDCP PDUs (or PDCP SDUs) having an identical sequence number (SN) for transmitting data in duplicate through one or more radio cells, and then submits the duplicated or copied PDCP PDUs (or PDCP SDUs) to a lower layer(s).

A PDCP entity of the base station receives the PDCP PDUs (or PDCP SDUs) received through one or more radio cells. For example, the PDCP entity may process data received first and discard duplicate data. As another example, the function of detecting and discarding duplicate data may be performed by the PDCP entity. For example, a transmitting side may transmit data having an identical PDCP SN through two paths, and a receiving side may detect the duplicate data based on the PDCP SN (or discard the detected data after detecting). The base station may transmit configuration information for indicating or processing such an operation to the UE.

In case of user plane data, data duplicate transmission may be processed in a PDCP layer connected through a new AS sublayer. On the contrary, an RRC message may or may not go through the new AS sublayer.

For example, in case of an RRC message, data duplicate transmission may be processed in the PDCP through the new AS sublayer. As another example, in the case of an RRC message, data duplicate transmission may be processed in the PDCP through direct connection without going through the new AS sublayer.

Hereinafter, i) operations for configuring duplicate transmission while CA based on a single base station is configured for a UE and the base station, and ii) operations for processing a buffer status report when the CA is configured will be described. For example, operations of a UE and a base station according to an embodiment of the present disclosure will be described with reference to FIGS. 2 to 4. After description related to FIGS. 2 to 4, respective structures of the UE and the base station and operations thereof will be described in more detail below.

Figure 2:
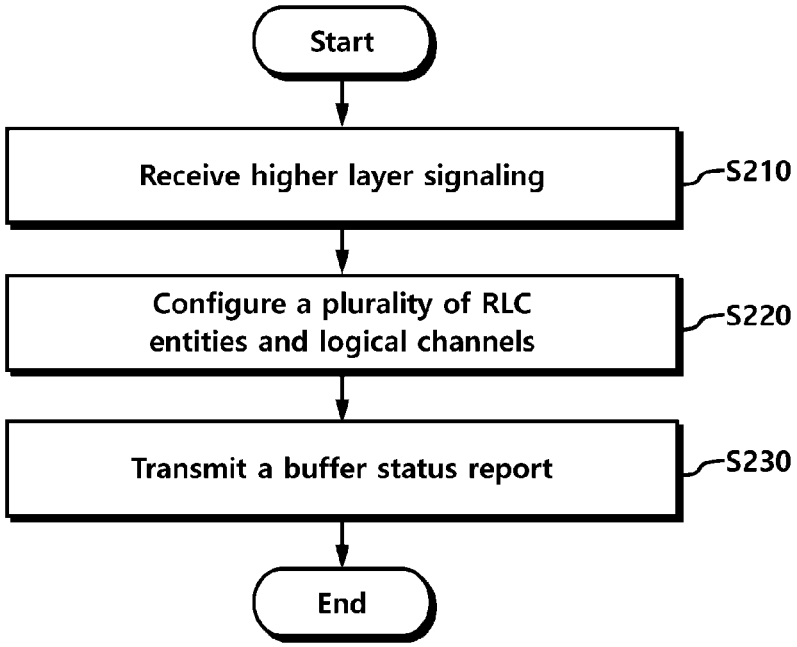
FIG. 2 is a flowchart illustrating operation of a user equipment according to embodiments of the present disclosure.

FIG. 2 is a flowchart illustrating operations of a UE according to an embodiment of the present disclosure.

Referring to FIG. 2, the UE may receive, from the base station, high layer signaling including information for configuring data duplicate transmission using CA at step S210.

For example, the UE may be configured with CA based on a single base station and receive an RRC message including additional RLC configuration information for performing duplicate transmission for identical data to a base station using the configured CA through a plurality of carriers.

For example, the information for configuring the duplicate transmission may include information on a plurality of RLC entities configured in the UE for transmitting data in duplicate, logical channel information associated with each RLC entity, information for associating each RLC entity with one PDCP entity, or MAC entity configuration information for the duplicate transmission.

In addition, the UE may configure a plurality of RLC entities including a first radio link control (RLC) entity and a second RLC entity associated with one packet data convergence protocol (PDCP) entity based on the high layer signaling, and configure a logical channel associated with the first RLC entity and a logical channel associated with the second RLC entity to one medium access control (MAC) entity at step S220.

For example, the UE may configure an additional RLC entity in the UE based on the received information for configuring the duplicate transmission. The additional RLC entity may be configured with a plurality of RLC entities according to the configuration of the base station. In the present disclosure, for convenience of description and ease of understanding, description is conducted on a case where two additional RLC entities are configured. It is noted that the present disclosure is not limited thereto. The UE may configure a first RLC entity and a second RLC entity to be associated with one PDCP entity, depending on high layer signaling. In addition, in order to distinguish an RLC entity added to one MAC entity, the UE may configure a logical channel to be associated with an RLC entity. That is, the UE may configure a logical channel associated with the first RLC entity and a logical channel associated with the second RLC entity to the MAC entity. Through this, the MAC entity may map data transmitted/received through one radio bearer to respective logical channels. Therefore, the MAC entity may perform duplicate transmission of PDCP data to the base station through a plurality of RLC entities or may transfer data received in duplicate to the PDCP entity through respective logical channels.

For example, one MAC entity may transmit data transferred through the logical channel associated with the first RLC entity and the logical channel associated with the second RLC entity to the base station through respective carriers.

As another example, the first RLC entity and the second RLC entity may be configured to be linked to different logical channels from each other based on a logical channel identifier.

As still another example, the first RLC entity and the second RLC entity may be configured to be associated with the one PDCP entity based on a radio bearer identifier.

Meanwhile, when data duplicate transmission is activated, the UE may transmit, to the base station, a buffer status report generated by including PDCP data volume configured to be included in both a logical channel group associated with the first RLC entity and a logical channel group associated with the second RLC entity at step S230.

For example, when duplicate transmission configuration, such as the configuration of a plurality of RLC entities, is completed and a data duplicate function is activated, the UE may transmit a buffer status report to the base station depending on a buffer status report triggering condition. It is noted that even when the duplicate transmission is configured for the UE, the data duplicate function may be not activated depending on configurations. In this case, the activation of the duplicate transmission may be indicated through a separate signal from the base station. For example, the signal for the activation of the duplicate transmission may be indicated through a MAC control element for each data radio bearer from the base station. That is, the base station may activate or deactivate the data duplicate function configured in the UE for each radio bearer through the MAC control element.

As described above, in case the duplicate transmission is configured for the UE and the data duplicate function is activated, the UE transmits the buffer status report to the base station. In this case, since the UE transmits data using the duplicate transmission to the base station, it is important to specify a method for transferring PDCP data volume to the base station.

For example, the UE may configure the PDCP data volume to be included in both of a logical channel group associated with the first RLC entity and a logical channel group logical channel associated with the second RLC entity. In addition, when configuring the PDCP data volume, the UE may configure a PDCP control PDU i) to be excluded from the PDCP data volume of a logical channel associated with the second RLC entity (an RLC entity additionally configured for the duplicate transmission) and ii) to be included in the PDCP data volume of a logical channel associated with the first RLC entity. In this case, the UE may transmit a buffer status report including buffer information of each logical channel group to the base station. That is, the PDCP data volume may be configured to be included in all logical channel groups associated with each RLC entity.

In addition, the UE may perform operations of each embodiment described below, and one or more steps or operations may be reordered, omitted, and added, if necessary.

Figure 3:
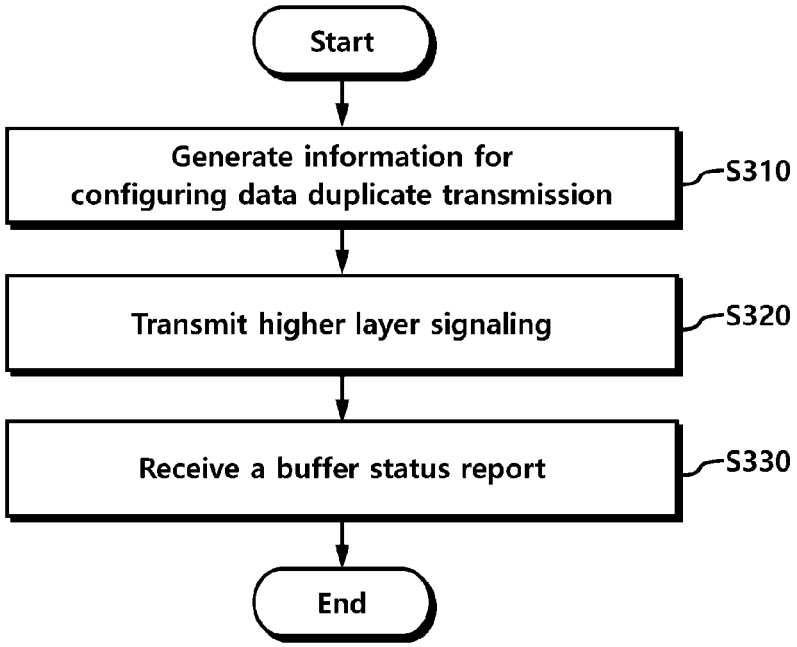
FIG. 3 is a flowchart illustrating operation of a base station according to embodiments of the present disclosure.

FIG. 3 is a flowchart illustrating operations of a base station according to embodiments of the present disclosure.

Referring to FIG. 3, the base station may generate information for configuring data duplicate transmission using CA at step S310. For example, the information for configuring the duplicate transmission may include information on a plurality of RLC entities configured in a UE for transmitting data in duplicate, logical channel information associated with each RLC entity, information for associating each RLC entity with one PDCP entity, and MAC entity configuration information for the duplicate transmission.

The base station may transmit, to the UE, high layer signaling including the information for configuring the data duplicate transmission using CA at step S320.

The base station may transmit the information for configuring the duplicate transmission of the UE based on a single base station through high layer signaling, such as an RRC message.

The UE may receive the information for configuring the duplicate transmission, configure a plurality of RLC entities including a first RLC entity and a second RLC entity associated with one PDCP entity, and configure a logical channel associated with the first RLC entity and a logical channel associated with the second RLC entity to one MAC entity.

For example, the UE may configure with an additional RLC entity based on the information for configuring the duplicate transmission. A plurality of additional RLC entities may be configured according to the configuration of the base station. The first RLC entity and the second RLC entity may be configured to be corresponded associated with one PDCP entity. In addition, in order for one MAC entity to distinguish between a typical RLC entity and the additional RLC entity, the UE may configure one or more logical channels to be associated with the RLC entities. That is, the UE may configure a logical channel associated with the first RLC entity and a logical channel associated with the second RLC entity to the MAC entity. Further, the first RLC entity and the second RLC entity may be configured to be associated with different logical channels from each other based on a logical channel identifier. Further, the UE may configure the first RLC entity and the second RLC entity to be associated with one PDCP entity based on a radio bearer identifier.

Thereafter, when the data duplicate transmission is activated for the UE, the base station may receive, in duplicate, data transferred being associated with each logical channel of the UE through different carriers from each other. That is, the same data may be received in duplicate. Here, the different carriers from each other may be carriers configuring CA of the UE.

When the data duplicate transmission is activated, the base station may receive, from the UE, a buffer status report configured by including PDCP data volume of the UE in each of a logical channel group associated with a first RLC entity and a logical channel group associated with a second RLC entity at step S330.

When duplicate transmission configuration, such as the configuration of a plurality of RLC entities, is completed and when a data duplicate function is activated, the UE may transmit the buffer status report to the base station depending on a buffer status report triggering condition, and the base station may receive the buffer status report.

The buffer status report may include PDCP data volume for each logical channel group. To this end, the UE may include the PDCP data volume in both a logical channel group associated with the first RLC entity and a logical channel group associated with the second RLC entity, and then transmit the buffer status report including the PDCP data volume for each logical channel group to the base station. That is, when the buffer status report including the PDCP data volume is received, the PDCP data volume may be included in all logical channel groups associated with each RLC entity. In this case, the PDCP data volume of the logical channel associated with the second RLC entity may be configured to exclude a PDCP control PDU, and then the PDCP data volume except for the PDCP control PDU is received by the base station. Further, the PDCP data volume of a logical channel associated with the first RLC entity may be received by the base station including a PDCP control PDU. That is, the PDCP control PDU included in the PDCP data volume may be included in only a logical channel (or logical channel group) associated with the first RLC entity. Accordingly, the PDCP data volume, which does not include the PDCP control PDU, of a logical channel (or logical channel group) associated with an RLC entity configured for duplicate transmission may be indicated to a MAC entity.

In addition, the base station may perform operations of each embodiment described below, and one or more steps or operations may be reordered, omitted, and added, if necessary.

Figure 4:
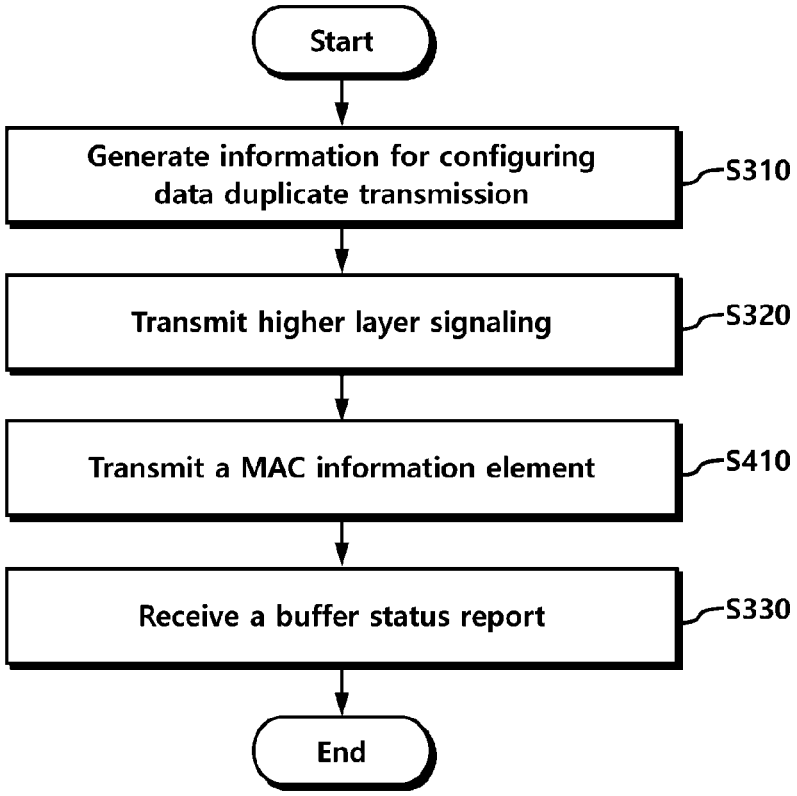
FIG. 4 is a flowchart illustrating operation of a base station according to another embodiment of the present disclosure.

FIG. 4 is a flowchart illustrating operation of a base station according to another embodiment of the present disclosure.

Referring to FIG. 4, before receiving a buffer status report, the base station may transmit information for instructing data duplicate transmission of a UE to be activated through a MAC control element for each data radio bearer at step S410. That is, the activation of the data duplicate transmission may be indicated through a separate signal from the base station. For example, the signal for the activation of the duplicate transmission may be indicated to the UE through a MAC control element for each data radio bearer. That is, the base station may activate or deactivate the duplicate data function configured in the UE for each radio bearer through the MAC control element.

When the duplicate transmission is configured, if the UE is configured in activation state, the base station may not transmit a MAC control element for activating the duplicate transmission.

Through operations described above, the UE and the base station may configure duplicate transmission to be performed through CA based on a single base station and process a buffer status report. Hereinafter, various embodiments are discussed for configuring duplicate transmission for a UE and a base station. Thereafter, various embodiments are discussed for processing a buffer status report.

First, embodiments for configuring duplicate transmission will be described. Each of the embodiments described below may be applied independently or in combination with one or more elements, examples, or embodiments. All description related to the embodiments described herein is included within the scope of the present disclosure. In addition, hereinafter, duplicate transmission in the UL is mainly described, but also duplicate transmission in the DL may be applicable in the same or similar manner.

1. MAC Entity

1) Using Two MAC Entities

Figure 5:
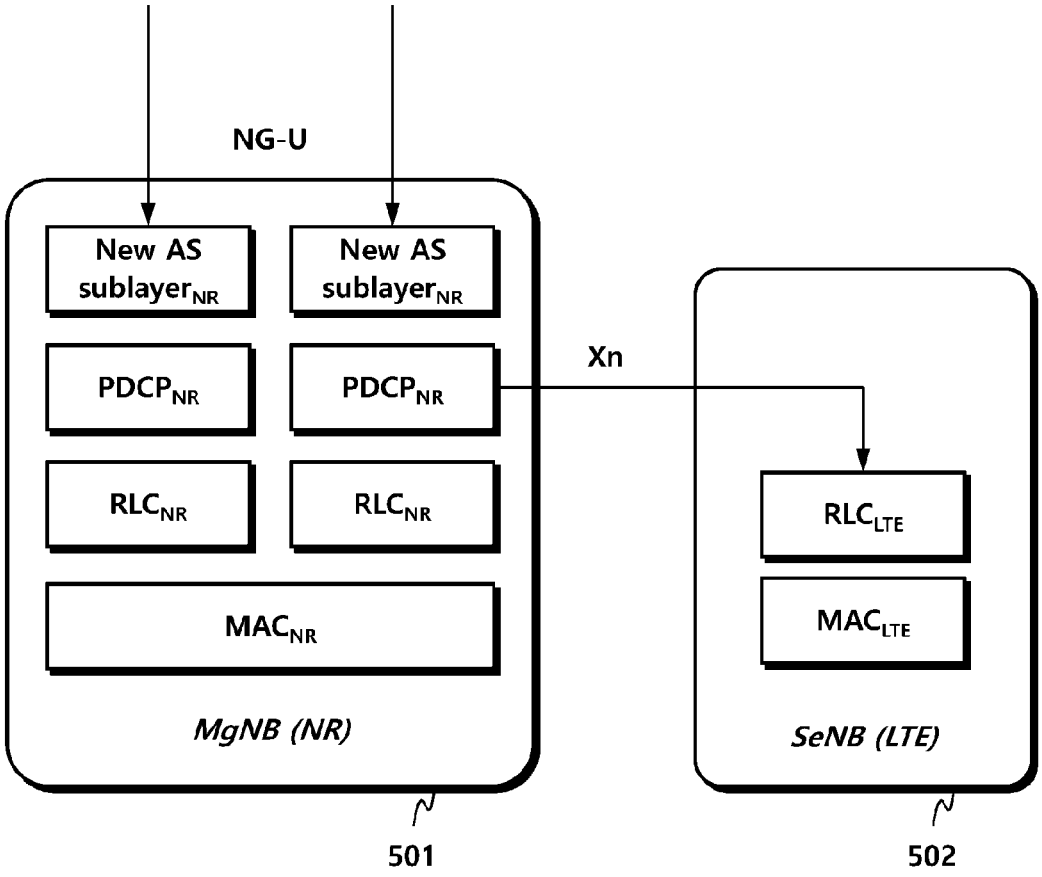
FIG. 5 is a diagram illustrating a split bearer structure through a master cell group in multi-connectivity between heterogeneous base stations.

FIG. 5 is a diagram illustrating a split bearer structure through a master cell group in multi-connectivity between heterogeneous base stations.

Referring to FIG. 5, a dual/multi connectivity based split bearer structure may be reused for transmitting data in duplicate between a single base station and a UE through one or more cells based on CA. For example, in case a master base station is an NR base station 501 and a secondary base station is an LTE base station 502, a UE may configure a dual connectivity based split bearer structure. That is, the UE may transmit/receive data using two radio resources through i) a bearer through the NR base station 501 and ii) a split bearer associated with an RLC entity of the LTE base station 502 split from a PDCP entity of the NR base station 501.

In case of CA based on a single base station, duplicate transmission may be performed in a structure similar to that of the split bearer as shown in FIG. 5.

Figure 6:
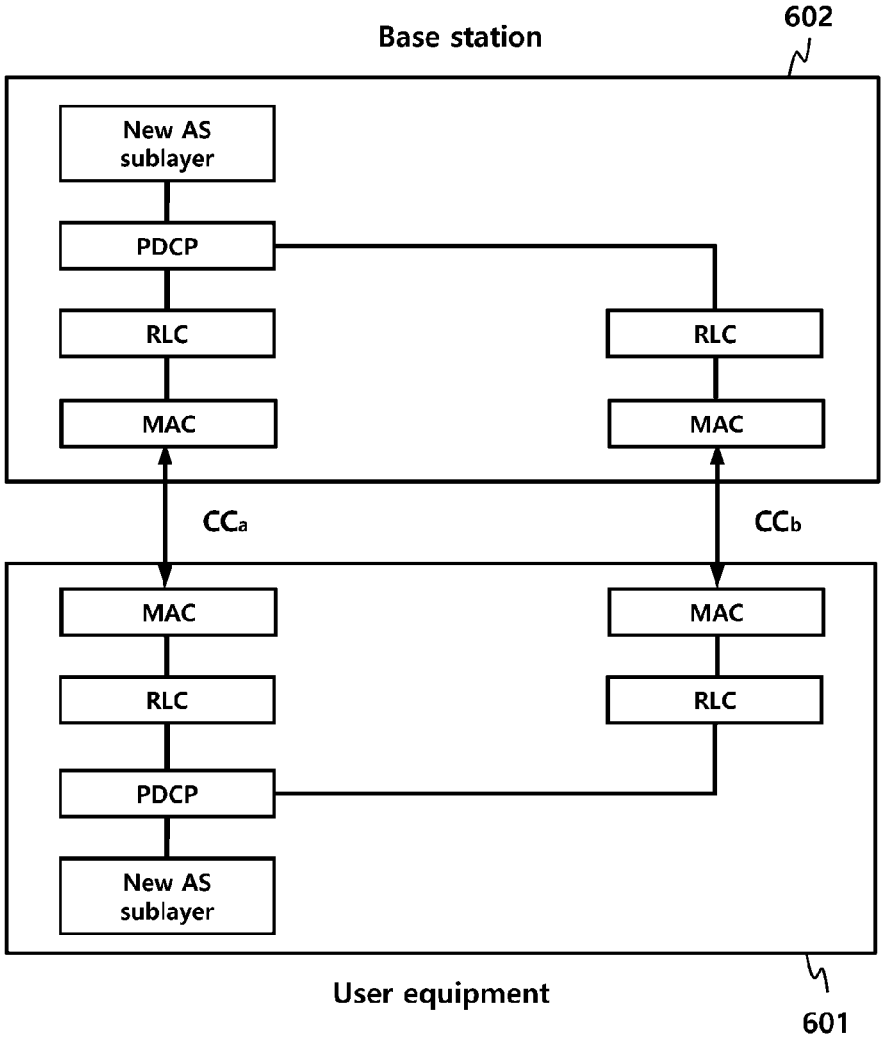
FIG. 6 is a diagram illustrating an example of a structure for data duplicate transmission based on carrier aggregation.
Figure 7:
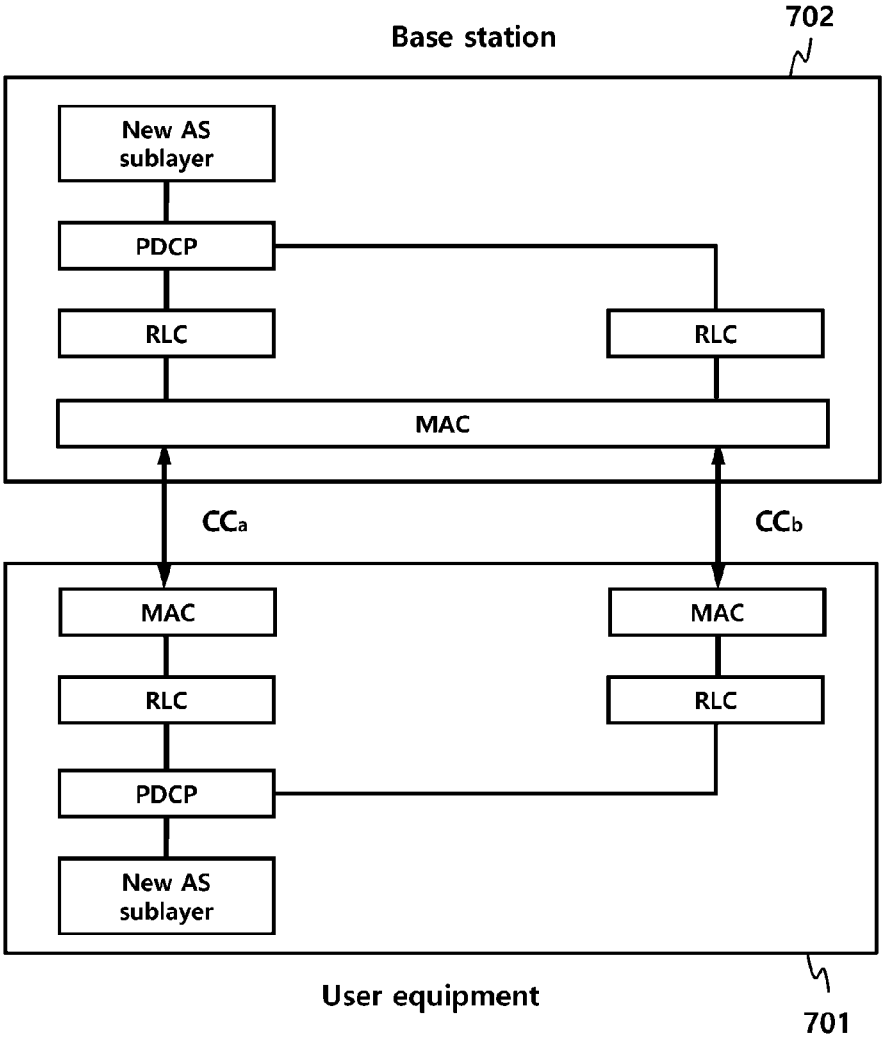
FIG. 7 is a diagram illustrating another example of a structure for data duplicate transmission based on carrier aggregation.

FIG. 6 is a diagram illustrating an exemplary structure for data duplicate transmission based on CA. FIG. 7 is a diagram illustrating another exemplary structure for data duplicate transmission based on CA.

Referring to FIGS. 6 and 7, UEs 601, 701 may be configured to transmit data in duplicate using two MAC entities of the UEs 601, 701 through one or more carriers provided according to CA. To transmit data in duplicate through two MAC entities in the UE, a base station is required to generate a MAC entity for duplicate transmission (for convenience of description, referred to as "second MAC entity". That is, a typical MAC entity based on a single base station is referred to as "first MAC entity", and a MAC entity added for the duplicate transmission based on a single base station is referred to as the second MAC entity.).

For example, the UEs 601, 701 generates a second MAC entity, when receiving an RRC (reconfiguration) message including configuration information indicating duplicate transmission based on CA based on a respective single base station 602 or 702. Unlike a SCG MAC entity configured by a base station (secondary base station) independent of a master base station based on dual connectivity, the second MAC entity configured by a single base station may be configured such that the base station directly effectively sets specific configuration information for two MAC entities.

For example, each of the first MAC entity and the second MAC entity may perform some or all parts of a MAC procedure independently of the other. Since the second MAC entity is used for reliable duplicate transmission rather than efficiency, the second MAC entity may perform some or all parts of the MAC procedure independently of the first MAC entity. Such a part of the MAC procedures may be one or more of a buffer status report (BSR), a scheduling request (SR), a logical channel prioritization (LCP), or a power headroom report (PHR).

For another example, the MAC procedure may be performed by coordination between the first MAC entity and the second MAC entity. Although the second MAC entity is used for reliable duplicate transmission rather than efficiency, it may be an efficient way for the second MAC entity itself to coordinate one or more parts of the MAC procedure. Such a part of the MAC procedure may be one or more of a BSR, a SR, an LCP, a PHR, or a DRX.

For another example, the first MAC entity may provide all or most parts of the MAC procedure performed in the two MAC entities, and the second MAC entity may perform some restricted functionalities. For example, the second MAC entity may perform one or more of a function of associating data transmitted/received from a second RLC entity that belongs to one radio bearer with a logical channel or a routing function related to this, or a function of including/excluding information for distinguishing this in a data header.

Each MAC entity may distinguish logical channels associated with each RLC entity that belongs to one radio bearer. Alternatively, each MAC entity may include one or more carriers.

When data duplicate function is configured, at least one of carriers (or cells) included in each MAC entity is required to be activated in order to perform duplicate transmission.

For example, when configuring the data duplicate function, a base station may configure one or more cells configured in a second MAC entity to be in an activation state.

As another example, when configuring the data duplicate function, the base station may define and indicate one or more cells configured in a second MAC entity as a specific cell distinct from other Scells. It is noted that it may be not necessary for the specific cell to provide a function of transmitting a PUCCH.

As another example, when configuring the data duplicate function, the base station may configure a specific cell configured in a second MAC entity to be always in an activation state.

For example, when configuring the data duplicate function, the base station may configure a cell in a second MAC entity to be in a deactivation state. For activating the data duplicate function, a base station may activate one or more (or a specific cell) of cells configured in a second MAC entity. A deactivation timer provided to a Scell may not be applicable to the corresponding cell.

As another example, when activating the data duplicate function, the base station may configure a cell configured in a second MAC entity to be in a deactivation state. A base station may activate the data duplicate function only when one or more of cells configured in a second MAC entity are activated.

As another example, when configuring the data duplicate function, the base station may configure a cell in a second MAC entity to be in a deactivation state. When configuring (or activating) the data duplicate function, the base station may enable one or more of cells in a second MAC entity to maintain so as not to be deactivated. Alternatively, a base station may instruct to restart a timer. Alternatively, a base station may indicate a deactivation timer as a specific value.

As another example, when configuring the data duplicate function, the base station may configure a cell configured in a second MAC entity to be in an activation state. When configuring (or activating) the data duplicate function, the base station may instruct one or more of cells configured in a second MAC entity to be activated. Alternatively, when configuring the data duplicate function by the base station, or activating the data duplicate function, the UE may activate one or more of cells configured in a second MAC entity.

As another example, when configuring the data duplicate function, the base station may configure a duplicate transmission activation condition for a UE. If a condition of the duplicate transmission is satisfied, the UE may transmit information for activating one or more of cells configured in a second MAC entity to the base station.

2) Using One MAC Entity

Figure 8:
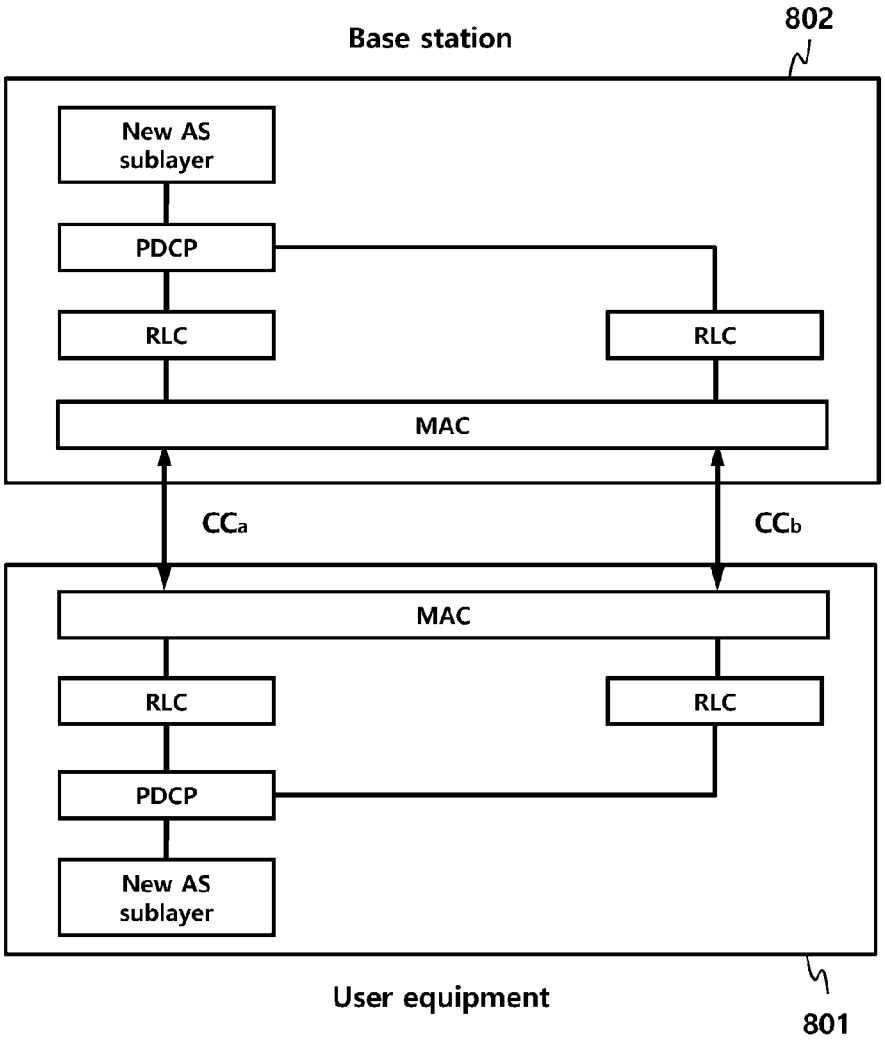
FIG. 8 is a diagram illustrating still another example of a structure for data duplicate transmission based on carrier aggregation.

FIG. 8 is a diagram illustrating still another exemplary structure for data duplicate transmission based on carrier aggregation.

Referring to FIG. 8, data may be transmitted in duplicate through one or more of cells provided through CA using one MAC entity in a UE 801. In order to transmit data in duplicate through one MAC entity in the UE 801, a base station 802 may include one or more RLC entities and one or more logical channels, associated with the one MAC entity for one radio bearer. The MAC entity may include one or more cells/carriers.

When the data duplicate function is configured, it is necessary for each logical channel that belongs to one radio bearer to be mapped (associated or linked) to one or more cells/carriers exclusive to others. That is, it is necessary for duplicate data from the PDCP to be transmitted through different cells/carriers from one another. Description on this will be given later.

When the data duplicate function is configured, it is necessary for at least one of cells/carriers associated with each logical channel that belongs to one radio bearer to be activated to perform the duplicate transmission.

For example, when configuring the data duplicate function, the base station may configure one or more of cells/carriers associated with each logical channel that belongs to one radio bearer to be in an activation state.

As another example, the base station may define and indicate one or more cells as a specific cell(s) distinct from other Scell(s), for one or more cells/carriers/cell groups/carrier groups not including a PCell among one or more cells/carriers/cell groups/carrier groups associated with each logical channel that belongs to one radio bearer.

As another example, when configuring the data duplicate function, the base station may configure one or more specific cells (specific secondary cell) of cells/carriers associated with each logical channel that belongs to one radio bearer to be always in an activation state.

As another example, when configuring the data duplicate function, the base station may configure one or more secondary cells associated with each logical channel that belongs to one radio bearer to be in a deactivation state. For activating the data duplicate function, the base station may activate one or more (or specific cell) of secondary cells/carriers associated with each logical channel that belongs to one radio bearer. A deactivation timer provided to a Scell may not be applicable to the corresponding cell.

As another example, when configuring the data duplicate function, the base station may configure one or more secondary cells associated with each logical channel that belongs to one radio bearer to be in a deactivation state. The base station may activate the data duplicate function only when one or more of secondary cells associated with each logical channel that belongs to one radio bearer are activated As another example, when configuring the data duplicate function, the base station may configure one or more secondary cells associated with each logical channel that belongs to one radio bearer to be in a deactivation state. When configuring (or activating) the data duplicate function, the base station may enable one or more secondary cells associated with each logical channel that belongs to one radio bearer to maintain so as not to be deactivated. Alternatively, a base station may instruct to restart a timer. Alternatively, a base station may indicate a deactivation timer as a specific value.

As another example, when configuring the data duplicate function, the base station may configure one or more secondary cells associated with each logical channel that belongs to one radio bearer to be in a deactivation state. When configuring (or activating) the data duplicate function, the base station may instruct one or more secondary cells associated with each logical channel that belongs to one radio bearer to be activated. Alternatively, when configuring the data duplicate function by the base station, or when activating the data duplicate function, the UE may activate one or more secondary cells associated with each logical channel that belongs to one radio bearer.

As another example, when configuring the data duplicate function, the base station may configure a duplicate transmission activation condition for a UE. If a condition of the duplicate transmission is satisfied, the UE may transmit information for activating at least one secondary cell (e.g., secondary cell(s) associated with one or more cell groups not including a PCell) associated with each logical channel that belongs to one radio bearer to the base station.

3) Mapping Between a Logical Channel and a Cell

Hereinafter, mapping between a logical channel and a cell (carrier) will be described. Mapping between the logical channel and the cell may be applicable to the embodiments described above.

A traffic transmission (or routing) restriction may be imposed on each logical channel for one or more logical channels that belong to one signaling radio bearer (SRB) or data radio bearer (DRB). A logical channel configuration may indicate whether transmission of traffic for one logical channel is available in specific cells.

For example, the logical channel configuration may be configured for each serving cell. As another example, the logical channel configuration may be configured for each logical channel.

For example, in case of a PCell, the logical channel configuration may be configured in the first MAC entity. In case of a SCell, the logical channel configuration may be included in one of the first MAC entity or the second MAC entity. A base station may include information indicating the logical channel configuration in SCell configuration information.

As another example, a cell in the first MAC entity may be configured to transmit traffic through only a logical channel/logical channel group configured in the first MAC entity. A cell in the second MAC entity may be configured to transmit traffic through only a logical channel/logical channel group configured in the second MAC entity. Joint processing of UL grant in one TTI is allowed only when servicing a logical channel with identical UL grant in each MAC entity. For UL grant for a cell that belongs to the first MAC entity, a UE performs an LCP for logical channels associated with the first MAC entity. For UL grant for a cell that belongs to the second MAC entity, a UE performs an LCP for logical channels associated with the second MAC entity.

As another example, for the duplicate transmission, a base station may configure one or more SCells (for convenience of description, referred to as "second cell" or "second cell group", that is, a typical cell (PCell or SCell) based on a single base station is referred to as "first cell" or "first cell group", and a SCell added for the duplicate transmission based on a single base station is referred to as the second cell or the second cell group). When configuring the data duplicate function, the base station may configure information for instructing to perform, through the second cell or the second cell group, transmission for a second logical channel (for convenience of description, a basic logical channel mapped on a MAC entity for one radio bearer is referred to as "primary logical channel", and a logical channel added the radio bearer is referred to as "secondary logical channel") added to a primary logical channel for each logical channel that belongs to one radio bearer.

As another example, the base station may include one or more of PCI, ServingCellindex, or SCellindex, as cell identification information, of a second cell for the duplicate transmission or a list of corresponding the cell identification information in logical channel configuration information, and transmit the traffic of a secondary logical channel that belongs to one radio bearer through the second cell. The cell identification information list may be included in the logical channel configuration information in sequence or as a bitmap. A bitmap of 8 bits may be formed if a second cell/second cell group is configured with one or more SCells having ServingCellindex/SCellindex less than or equal to 7. For example, in case the second cell/second cell group is configured with cells corresponding to the second and the third in the ServingCellindex/SCellindex, the base station may include a bitmap represented as '00110000' in logical channel configuration information for a secondary logical channel. The corresponding logical channel may be transmitted through only a cell set to 1 in the corresponding bitmap. For example, assuming that the ServingCellindex of a PCell is 0, a bit with SCellindex 2 may be correspond to the third bit, and a bit with SCellindex 3 may be corresponding to the fourth bit.

A bitmap of 16 bits may be formed if a second cell/second cell group is configured with one or more SCells having ServingCellindex/SCellindex less than or equal to 15. For example, in case the second cell/second cell group is configured with cells corresponding to the second and the third in the ServingCellindex/SCellindex, the base station may include a bitmap represented as '0011000000000000' in logical channel configuration information for a secondary logical channel. The corresponding logical channel may be transmitted through only a cell set to 1 in the corresponding bitmap. A bitmap of 32 bits may be formed if a second cell/second cell group is configured with one or more SCells having ServingCellindex/SCellindex less than or equal to 31. For example, in case the second cell/second cell group is configured with cells corresponding to the second, the third, and the eighth in the ServingCellindex/SCellindex, the base station may include a bitmap represented as '00110001000000000000000000000000' in logical channel configuration information for a secondary logical channel. The corresponding logical channel may be transmitted through only a cell set to 1 in the corresponding bitmap.

For UL group for a first cell or a first cell group, the UE performs an LCP for only a logical channel transmitted to the first cell or the first cell group.

For UL group for a second cell or a second cell group, the UE performs an LCP for only a logical channel transmitted to the second cell or the second cell group.

As another example, indication as to whether transmission is available in a specific cell for each logical channel may be performed for one or more logical channels that belong to one SRB or DRB. For example, instruction may be performed for enabling a primary logical channel to be transmitted through only a PCell, and a secondary logical channel to be transmitted through the remaining cell/cell group (or the transmission of the secondary logical channel through the PCell not to be allowed). As another example, instruction may be performed for enabling a primary logical channel to be transmitted through a specific cell group including a PCell, and a secondary logical channel to be transmitted through the remaining cell/cell group (or the transmission of the secondary logical channel through the specific cell group including the PCell not to be allowed).

As another example, instruction may be performed for enabling transmission to be performed through only a specific cell/cell group.

Two logical channels included in a duplicate transmission bearer may have a cell identifier or a cell identifier list for each logical channel. A cell identifier or a cell identifier group for each logical channel may be configured so as not to overlap with others. A cell identifier or a cell identifier group for each logical channel may be configured exclusively to others.

When the data duplicate function is configured, it is necessary for PDCP data that belongs to one radio bearer to be transferred to cells/carriers associated with respective logical channels assuming that one or more RLC entities.

For example, to do this, a cell group/carrier group (or second cell group) for the duplicate transmission may be defined. In addition, a logical channel group (or second logical channel group) mapped to this cell group for the duplicate transmission may be defined. Logical channel identification information in each logical channel group may be configured independently of others. Alternatively, a DRB may have one of the values from 3 to 8 in each logical channel group. RLC entities associated with this cell group or logical channel group may be configured to be distinguished from others.

As another example, a logical channel group (or second logical channel group) or a logical channel group (or second logical channel group) list mapped to a cell/cell group using a cell group/carrier group (or a second cell group or a specific cell or a cell except for the specific cell) for the duplicate transmission may be defined. A logical channel group list may be included in cell/cell group configuration information in sequence or as a bitmap. For example, the cell group/carrier group configuration information may include logical channel configuration information, each of which is listed in order, with each logical channel identifier included in a second logical channel group. The cell group/carrier group configuration information may include information for indicating a second cell/second cell group. For example, the cell group/carrier group configuration information may be provided through a cell group identifier. As another example, the cell group/carrier group configuration information may be indicated through an identifier different from an MCG cell group identifier. Logical channel identification information in each logical channel group may be configured independently of others. Alternatively, a DRB may have one of the values from 3 to 8 or from 4 to 31 in each logical channel group. Configuration information of one RLC entity (second RLC entity) and configuration information of one logical channel (secondary logical channel) for one radio bearer may be included for the logical channel group. This may be mapped through bearer identification information.

2. RLC Entity

1) Configuring an Additional RLC Entity for Duplicate Transmission

A base station may configure an additional RLC entity in a UE (for convenience of description, hereinafter, the additional RLC entity is referred to as "second RLC entity for duplicate transmission", This term is just for convenience of description and ease of understanding, and therefore other terms are included in the scope of the present disclosure. For example, it is possible to use an arbitrary term, such as a second RLC entity (secondary RLC entity) distinct from a first RLC entity (primary RLC entity) configured for one bearer).

The base station may configure CA for a UE having a single connection to one base station. Through this, the UE may transmit data to or receive data from a single base station through a plurality of radio paths. The base station may provide related configuration information to the UE. For example, the base station may configure one or more RLC entities mapped to one data radio bearer (DRB) for the UE. The one or more RLC entities may be one or more RLC entities distinct from an SCG RLC entity provided for a split bearer in the typical dual connectivity. That is, the one or more RLC entities may be an RLC entity included in a typical (or added for a master cell group (MCG)) DRB configuration information (DRB-ToAddModSCG) distinct from an RLC entity included in DRB configuration information (DRB-ToAddModSCG) added for a secondary cell group (SCG). Alternatively, the one or more RLC entities may be an RLC entity included in cell group configuration information (CellGroupConfig) added for MCG distinct from an RLC entity included in cell group configuration information (CellGroupConfig) added for a SCG.

FIG. 9 is a diagram illustrating RLC configuration information according to an embodiment of the present disclosure.

As shown in FIG. 9, the RLC configuration information may include information on one or more of an RLC entity for the duplicate transmission, a logical channel identifier for the duplicate transmission, and logical channel configuration information for the duplicate transmission, for one SRB or DRB. Through this, the UE may configure a second RLC entity for the duplicate transmission to be associated with a logical channel for the duplicate transmission.

FIG. 10 is a diagram illustrating RLC configuration information according to another embodiment of the present disclosure.

As shown in FIG. 10, the RLC configuration information may include information on one or more of radio bearer identification information for the duplicate transmission, an RLC entity for the duplicate transmission, a logical channel identifier for duplicate transmission, and logical channel configuration information for duplicate transmission, for one SRB or DRB. Through this, the UE may configure a second RLC entity for the duplicate transmission to be associated with a logical channel for the duplicate transmission. In addition, a PDCP entity may configure a corresponding radio bearer to be associated with a first RLC entity and a second RLC entity.

FIG. 11 is a diagram illustrating RLC configuration information according to further another embodiment of the present disclosure.

As shown in FIG. 11, radio bearer configuration information may include information on one or more of RLC configuration information used for the duplicate transmission and logical channel configuration information used for the duplicate transmission, for one SRB or DRB. To associate a plurality of entities with one radio bearer, the RLC configuration information may be listed in sequence. The RLC configuration information may include information for distinguishing each RLC entity associated with one radio bearer. For example, the RLC configuration information may include RLC identification information. The RLC configuration information may be configured to include up to 2 or 4 RLC identification information. As another example, the RLC identification information may be represented by information (BOOLEAN) for identifying RLC entity for the duplicate transmission. When the RLC identification information have an integer value, the smallest value (for example, 0) may be a basic RLC entity (first RLC entity). For example, identification information of one RLC entity may be set as a value identical to logical channel identification information (logical channel identifier). As another example, mapping information/mapping rule for mapping between an RLC entity and logical channel information may be included in the RLC configuration information or the RLC identification information. For example, one or more RLC entities for duplicate transmission may be distinguished through logical channel identification information of a logical channel for duplicate transmission. In addition, a PDCP entity may configure a corresponding radio bearer to be associated with a first RLC entity and a second RLC entity.

FIG. 12 is a diagram illustrating RLC configuration information according to yet another embodiments of the present disclosure. FIG. 13 is a diagram illustrating RLC configuration information according to still another embodiment of the present disclosure.

As shown in FIG. 12 or 13, radio bearer configuration information may include information for mapping each of one or more RLC entities to each of one or more logical channels, used for the duplicate transmission, for one SRB or DRB. For example, an RLC entity may be distinguished through logical channel identification information of a logical channel for the duplicate transmission for one radio bearer. In addition, a PDCP entity may configure a corresponding radio bearer to be associated with a first RLC entity and a second RLC entity.

A UE may perform duplicate transmission, when an additional RLC configuration information is configured by a base station, or the additional RLC configuration information is configured and data duplicate is activated.

A PDCP entity of the base station duplicates or copies PDCP PDUs (or PDCP SDUs) having an identical sequence number (SN) for transmitting data in duplicate through one or more radio cells, and then submits the duplicated or copied PDCP PDUs (or PDCP SDUs) to a lower layer(s). A PDCP entity of the UE receives the PDCP PDUs (or PDCP SDUs) received through one or more radio cells. For example, the PDCP entity may process data received first and discard duplicate data.

The PDCP entity of the UE duplicates or copies PDCP PDUs (or PDCP SDUs) having an identical sequence number (SN) for transmitting data in duplicate through one or more radio cells, and then submits the duplicated or copied PDCP PDUs (or PDCP SDUs) to a lower layer(s). The PDCP entity of the base station receives the PDCP PDUs (or PDCP SDUs) received through one or more radio cells.

When duplicate transmission is not activated (or a condition for activation is not satisfied), a PDCP entity of the base station submits PDCP PDUs to a first RLC entity, for DL transmission. If not, the a PDCP entity of the base station submits PDCP PDUs to the first RLC entity and a second RLC entity.

When duplicate transmission is not activated (or a condition for activation is not satisfied), the PDCP entity of the UE submits PDCP PDUs through the first RLC entity, for UL transmission. If not, the a PDCP entity of the UE submits PDCP PDUs through the first RLC entity and the second RLC entity.

For DL reception, the UE receives data using PDCP duplicate based on a single base station through a plurality of carriers. A MAC entity of the UE transfers the received data to a higher layer (RLC) based on logical channel identification information. That is, the MAC entity of the UE transfers the received data to an RLC entity based on the logical channel identification information. In the typical technology, since there are one logical channel of the MAC entity and one RLC entity, for one radio bearer, data therefore are transferred to the corresponding RLC entity based on logical channel identification information included in a MAC header. However, in case one or more RLC entities and one or more logical channels are established for one radio bearer, it is required to provide a mapping relationship between the RLC entities and the logical channels.

Through this, the MAC entity of the UE may transfer corresponding data to each corresponding RLC entity based on each of logical channel identification information. To this end, it is necessary for the base station to configure mapping information between each RLC entity and each logical channel for the UE. For example, this mapping information may be provided by combining one or more of the embodiments or examples with reference to FIGS. 6 to 11, described above. As another example, the mapping information may be provided through various embodiments or examples described above.

For UL transmission, the UE transmits data using PDCP duplicate based on a single base station through a plurality of carriers. The PDCP entity of the UE duplicates or copies PDCP PDUs (or PDCP SDUs) having an identical sequence number (SN) for transmitting data in duplicate through one or more radio cells, and then submits the duplicated or copied PDCP PDUs (or PDCP SDUs) to a lower layer(s). For example, the PDCP entity duplicates or copies PDCP PDUs (or PDCP SDUs) having an identical sequence number (SN) and then submits the duplicated or copied PDCP PDUs (or PDCP SDUs) to one or more RLC entities. This submission may be performed based on one PDCP entity configuration information and configuration information of one or more RLC entities that belong to one radio bearer. For example, to this end, mapping may be performed based on an identical radio bearer identifier (e.g., DRB-identity). As another example, to this end, configuration information of one PDCP may be configured to be associated with one or more RLC entities. Each RLC entity transfers the PDUs (or SDUs) from the PDCP entity to a MAC entity. For example, when one or more MAC entities are used, each RLC entity transfers an RLC PDU to each associated MAC entity As another example, when one MAC entity is used, related operations are as follows. For example, each RLC entity transfers corresponding RLC PDU to a MAC entity. The MAC entity may generate a MAC PDU based on logical channel identification information associated with the corresponding RLC entity. It is necessary for RLC entity configuration information to be mapped to the associated logical channel configuration information. This mapping may be provided by combining one or more of the embodiments or examples with reference to FIGS. 9 to 13, described above.

This mapping may be provided by defining logical channel identification information and RLC entity identification information and then mapping based on this definition, or defining logical channel identification information and RLC entity indexes and then mapping based on this definition. As another example, RLC entity indexes (or RLC identification information) may be configured and provided the same as the logical channel identification information. As another example, RLC entities may be configured by associating with logical channel identification information. As another example, in case two RLC entities and two logical channels are configured, a second RLC entity is mapped to a second logical channel for one radio bearer.

Meanwhile, transmitting RRC signaling messages or user plane data in duplicate over a plurality of radio interfaces results in an additional radio resource being consumed. However, it is possible to increase reliability of control plane message transmission or user plane data transmission. Further, if a secondary base station can directly transmit an RRC message to a UE through a radio interface, it may be beneficial to transmit rapidly data without latency of backhaul portion between base stations. Thus, duplicate transmission through a plurality of paths improves reliability but causes complexity and the consumption of radio resources due to the duplicate transmission.

Hereinafter, discussion are conducted based on the duplicate transmission of RRC messages. This is for convenience of description and ease of understanding, and therefore may be equally or similarly applicable to the duplicate transmission of user plane data. Accordingly, the duplicate transmission of user plane data is included in the scope of the present disclosure. For example, the duplicate transmission of control plane data and/or user plane data may be provided by PDCP entities of individual radio bearers for processing control plane data or user plane data on a control plane data or a user plane data basis.

In case duplicate transmission through a plurality of paths is configured to be operated continuously, there is a possibility that radio resources are excessively wasted. As an example of reducing the consumption of radio resource caused by duplicate transmission, a method may be used of indicating activation/deactivation (for convenience of description, referred to as activation/deactivation, and may be represented by various terms, such as, enable/disable, on/off, activation/deactivation, etc.) or on/off of the duplicate transmission.

DL RRC data duplicate transmission may be performed by effective determination of a base station for RRC data duplicate transmission, in the implementation of data duplicate. UL RRC data duplicate transmission may be performed by the indication of the base station.

For example, in case the base station sets indication information for indicating whether RRC message duplicate transmission is activated to an activation state and this setting is indicated (e.g., provided) to a UE, when generating an UL RRC message, the UE may enable a PDCP entity to transmit the corresponding RRC message through two transmission paths.

As another example, in case the base station sets indication information for indicating whether RRC message duplicate transmission is activated to a deactivation state and indicates (e.g., provide or transmit) this setting to a UE, when generating an UL RRC message, the UE may enable a PDCP entity to transmit the corresponding RRC message through one transmission path.

As still another example, in case the base station sets indication information for indicating whether RRC message duplicate transmission is activated to the deactivation state and indicates (e.g., provides or transmits) this setting to a UE, when generating an UL RRC message, the UE may enable the corresponding RRC message to be transmitted through a transmission path indicated by a PDCP entity. The transmission path(s) may be configured in advance in the UE or indicated by the base station.

If duplicate transmission is always performed through a plurality of paths, radio resources would be excessively wasted.

For DL RRC data duplicate transmission, a base station may determine effective RRC data duplicate transmission in view of implementation and perform data duplicate transmission based on the determination result.

On the contrary, in order for the UE to process effectively UL RRC data duplicate transmission, it is necessary for the UE to enable an RRC entity or a PDCP entity to transmit the RRC message through two paths, by the control of the base station.

If duplicate transmission through two paths is indicated, it may not be desirable to allow the duplicate transmission to be performed consecutively during corresponding RRC connection. Accordingly, the base station may indicate a timer for indicating duplicate transmission through multiple paths.

For example, the base station may indicate a duplicate transmission activation timer. When receiving an RRC message including the duplicate transmission activation timer, the UE starts the timer. When an UL RRC message is generated while the timer is running, the UE may enable the PDCP entity to transmit the RRC message through two paths. When an RRC message is generated after the timer has been expired, the UE may enable the PDCP entity to transmit the RRC message through one transmission path. Such a transmission path may be configured in advance in the UE or instructed by the base station. For example, the corresponding RLC entity may be an RLC entity configured in default for a corresponding radio bearer. As described above, the RLC entity configured in default is used for convenience of description and may be represented by various terms, such as, but not limited to, configured RLC entity, primary RLC entity, default RLC entity, first configured RLC entity, or the like.

As another example, when the duplicate transmission is activated, the base station may indicate a timer for deactivating the duplicate transmission. After receiving an RRC message including the timer for deactivating the duplicate transmission, the UE starts the timer when the duplicate transmission is activated depending on a specific indication or condition. When an UL RRC message is generated while the timer is running, the UE may enable the PDCP entity to transmit the RRC message through two paths. When an RRC message is generated after the timer has been expired, the UE may enable the PDCP entity to transmit the RRC message through one transmission path.

As another example, the UE enables restart of the timer to be performed i) when an UL RRC message is generated while the timer for deactivating the duplicate transmission is running, ii) when the PDCP entity transmits the RRC message through two paths, or iii) when the PDCP entity processes the duplicate transmission. When an RRC message is generated after the timer has been expired, the UE may enable the PDCP entity to transmit the RRC message through one transmission path.

The base station may identify the quality state of the radio link of the UE through an RRM measurement report, CQI feedback, or the like from the UE. Accordingly, the base station may indicate (e.g., instruct) activation/deactivation of duplicate transmission through lower layer information.

For example, whether data duplicate function in a PDCP entity configured in a UE is activated may be indicted through a MAC control element (CE). That is, when the duplicate transmission in the PDCP entity is configured in the UE, the base station may include indication information for indicating (e.g., instructing) activation or deactivation of the data duplicate in a MAC CE and then transmit the MAC CE including indication information to the UE. The corresponding indication information may include information for indicating (e.g., instructing) activation or deactivation for each data radio bearer. When the indication information indicates an activation state, the UE may transmit date in duplicate through a plurality of radio paths for the corresponding radio bearer. To this end, the PDCP entity may transfer an identical PDCP PDU to different RLC entities from one another. Indication information provided through a MAC CE to represent whether duplicate transmission operation is activated in the corresponding PDCP entity for each of one or more data radio bearers may include bitmap information for indicating an activation/deactivation state for each radio bearer corresponding to each radio bearer identifier. As another example, the base station may transmit (e.g., provide) indication information for indicating an activation/deactivation state through a PDCCH. As still another example, when receiving the indication information through the MAC CE or the PDCCH, the UE may transfer the indication information to the RRC layer or the PDCP layer processing the duplicate transmission. As yet another example, the base station may transmit the indication information through PDCP control data.

Meanwhile, the UE may transmit information for indicating that the duplicate transmission to be activated/deactivated (or that duplicate transmission has been activated/deactivated) to the base station using the MAC CE or the PUCCH.

Configuration information for indicating the configuration of RRC message duplicate transmission to the UE may include condition information for activating/deactivating RRC data duplicate transmission. Alternatively, the configuration information may include switching information for instructing to switch, for RRC messages, between two data transmission paths configured through dual connectivity to the UE, and the switching information may include condition information for switching between data transmission paths. For convenience of description and ease of understanding, a condition for activating duplicate transmission will be described. A condition for instructing to switch between two data transmission paths configured through dual connectivity may also be configured equally or similarly to that of the duplicate transmission. The corresponding condition for activating duplicate transmission may be included in the condition information.

For example, the condition information may include a reference radio signal quality value for activating RRC message duplicate transmission. For example, it is unnecessary for a UE to activate RRC duplicate transmission, if the radio quality of a master base station (or master TRP or master cell or PCell or anchor beam or best beam, for convenience of description, referred to as "master base station", but any transmission signal in the NR is included within the scope of the present disclosure.) satisfies (or exceeds, or equals to and greater than) a reference radio quality value. For example, if the radio quality of the master base station exceeds (or equals to and greater than) a reference value indicated by the base station, the UE may enable a PDCP entity to transmit an RRC message through one transmission path. That is, the RRC message may be transmitted through the master base station. As another example, if the radio quality of a master base station less than (or equals to and less than) a reference radio quality value, the UE may activate the RRC duplicate transmission. That is, if the radio quality of the master base station less than (or equals to and less than) a threshold value indicated by the base station, the UE may enable the PDCP entity to transmit an RRC message through two transmission paths.

As another example, the corresponding condition may be an UL data split threshold value. If data duplicate transmission is configured and data duplicate function is not in an activation state, and the data duplicate transmission is configured but the data duplicate function is not in a deactivation state, the UE may transfer PDCP data to an RRC entity of a configured single path, when available PDCP data volume and RLC data volume associated with two RLC entities are less than the corresponding condition.

As another example, if the radio quality of a secondary base station exceeds (or equals to and greater than) a threshold value indicated by the base station, the UE may enable a PDCP entity to transmit an RRC message through one transmission path. For example, the UE may transmit the data through only the secondary base station.

As another example, the base station may instruct the UE to transmit data through one path providing better radio quality of a master base station and a secondary base station.

As still another example, if both a master base station and a secondary base station have radio quality less than (or equals to and less than) a threshold value, the UE may enable the PDCP entity to transmit an RRC message through two transmission paths.

If a condition for activating/deactivating RRC duplicate transmission for these operations is satisfied, a physical layer may transfer this to a higher layer. For example, in case the PDCP layer transmits through two transmission paths, the physical layer may indicate this to the PDCP entity. As another example, in case the PDCP layer transmits through two transmission paths, the physical layer may indicate this to the RRC layer.

If the physical layer indicates that the corresponding condition is satisfied, the PDCP entity may activate or deactivate duplicate transmission.

To this end, the base station may transmit, to a UE, information on one or more of a threshold value of radio quality associated with activation/deactivation, a threshold condition (e.g., the number of times quality higher than a threshold value is detected, the number of times quality lower than a threshold value is detected, the number of times consecutive out of sync indications, the number of times consecutive in sync indications, an UL data split data volume threshold value, or the like), a timer for checking a condition of a threshold value, a time period for checking a condition of a threshold value, an indication condition to a higher layer, and filtering parameters. For example, to this end, an RLM procedure may be used. For another example, to this end, RRM measurement may be used. For further another example, to this end, beam measurement may be used.

The UE may monitor DL radio quality for a specific cell or all cells in a master cell group. This may be for triggering (determining/stopping/releasing/suspending) RRC duplicate transmission or PDCP data (PDCP SDU or PDCP PDU) duplicate transmission. In addition, the monitoring may be for indicating a state for RRC duplicate transmission or PDCP data duplicate transmission to a higher layer.

Likewise, the UE may monitor DL radio quality for a specific cell or all cells in a secondary cell group. This may be for triggering (determining/stopping/releasing/suspending) RRC duplicate transmission or PDCP data (PDCP SDU or PDCP PDU) duplicate transmission. In addition, the monitoring may be for indicating a state for RRC duplicate transmission or PDCP data duplicate transmission to a higher layer.

If the RLM is used, the base station may indicate a threshold value that the physical layer of the UE performing an RLM operation indicates to a higher layer. The threshold value may be a threshold value separated from a typical RLM operation.

As described above, the UE may be configured with one or more MAC entities or RLC entities and transmit data in duplicate through CA based on one base station. Through this, the UE may effectively perform duplicate transmission when transmitting data requiring reliability in duplicate.

Hereinafter, embodiments for a buffer status report (buffer status report) will be described, which is performed when a UE performs duplicate transmission using CA configured based on a single base station.

Buffer Status Reporting Procedure

The buffer status reporting procedure is a procedure used to provide information on data available for transmission in UL buffers associated with a MAC entity to a serving base station. An RRC entity configures three timers (e.g., periodicBSR-Timer, retxBSR-Timer and logicalChannelSR-ProhibitTimer) and controls buffer status report (BSR) transmission through signaling allocating a logical channel to a logical channel group for each logical channel.

The buffer status report should be triggered when the following events occur.

- UL data, for a logical channel which belongs to one logical channel group (LCG), becomes available for transmission in a radio link control (RLC) entity or a packet data convergence protocol (PDCP) entity (the definition of what data shall be considered as available for transmission is specified in [3] and [4] respectively). In addition, either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR.
- UL resources are allocated, and number of padding bits is equal to or larger than the size of the buffer status report MAC control element plus its subheader, in which case the BSR is referred to as "Padding BSR."
- retxBSR-Timer expires, and the UE has data available for transmission for any of the logical channels which belong to an LCG, in which case the BSR is referred to as "Regular BSR"
- periodicBSR-Timer expires, in which case the BSR is referred to as "Periodic BSR".

The buffer status report may be classified into a Short BSR, a Truncated BSR, and a Long BSR according to the format, along with the classification according to the type of the BSR trigger.

Figure 14:
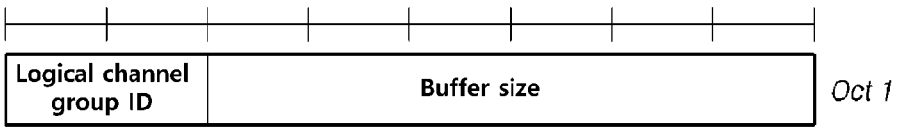
FIG. 14 is a diagram illustrating Short BSR/Truncated BSR formats according to a typical technique.
Figure 15:
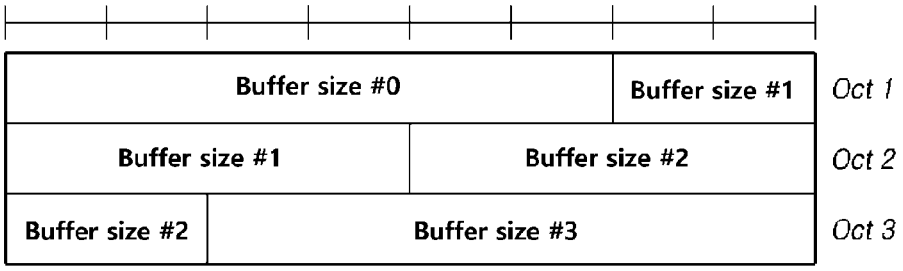
FIG. 15 is a diagram illustrating a Long BSR format according to a typical technique.

FIG. 14 is a diagram illustrating the Short BSR format, and FIG. 15 is a diagram illustrating the Long BSR format.

For the Regular BSR or the Periodic BSR, if more than one LCG has data available for transmission in the transmission time interval (TTI) where the BSR is transmitted: report Long BSR. If not, report Short BSR.

For the Padding BSR, if the number of padding bits is equal to or larger than the size of the Short BSR plus its subheader but smaller than the size of the Long BSR plus its subheader: if more than one LCG has data available for transmission in the TTI where the BSR is transmitted: report Truncated BSR of the LCG with the highest priority logical channel with data available for transmission. If not, report Short BSR.

If the number of padding bits is equal to or larger than the size of the Long BSR plus its subheader: report Long BSR.

As shown in FIG. 2, the Short BSR and the Truncated BSR include logical channel group ID information and buffer size information. As shown in FIG. 2, the Long BSR includes buffer size information for 4 LCGs sequentially.

The BSR is transmitted through a MAC control element (MAC CE), and one MAC protocol data unit (PDU) may include one MAC BSR control element at most.

When one BSR is included in one MAC PDU for transmission, all triggered BSRs are canceled.

A MAC entity is required to transmit one Regular/Periodic BSR at most in one transmission time interval (TTI).

All BSRs transmitted in one TTI always represents a buffer status after all MAC PDUs for this TTI have been generated. Each logical channel group is required to transmit one buffer status value per TTI at most. This buffer status value is required to be transmitted in all BSRs transmitting a buffer status for this logical channel group.

Data Available for Transmission or Data Volume

For the purposes of the buffer state report of the MAC layer, a UE is required to take the following into account as data volume available for in the RLC layer.

RLC SDUs not yet included in an RLC data PDU, or segments

Pending RLC data PDUs (RLC AM) for retransmission,

Pending RLC data PDUs for initial transmission

For the purposes of the buffer state report of the MAC layer, a UE is required to take PDCP control PDUs and the following into account as data volume available for in the RLC layer.

For SDUs whose PDUs are not submitted to a lower layer,

If there is an SDU that has not yet been processed by the PDCP, the SDU itself

If there is an SDU processed by the PDCP, the PDCP

As described above, in the typical LTE technology, the buffer status of a UE is reported through the Regular BSR, the Periodic BSR or the Padding BSR. In case packed duplicate transmission is configured for a specific bearer based on CA between a base station and a UE, or the packet duplicate transmission is started/activated/on for the bearer, if the UE reports a buffer status through the short BSR procedure, there is a possibility that the base station may not recognize a buffer status to be actually transmitted by the UE. Thus, there is a possibility that the base station may under-allocate an UL resource to the UE.

In accordance with embodiments of the present disclosure to address such an issue, methods and devices are provided for effectively performing buffer status reporting of a UE in case packed duplicate transmission is configured for a specific bearer based on CA between a base station and the UE, or the packet duplicate transmission is started/activated/on for the bearer.

Hereinafter, in case packed duplicate transmission is configured for a specific bearer based on CA between a base station and a UE, or the packet duplicate transmission is started/activated/on for the bearer, methods and devices for effectively providing buffer status reporting of a UE will be described. Embodiments described below may be applicable independently or in combination with one or more elements, examples, or embodiments. All embodiments and/or examples described below are included in the scope of the present disclosure.

Meanwhile, the term "transmission time interval (TTI)" used for convenience of description and ease of understanding may be referred to a transmission unit defined in the ER (e.g., a physical layer transmission unit, such as a slot, a mini-slot, or the like).

Hereinafter, methods of triggering a buffer status report (BSR) and transmitting the BSR according to embodiments will be described. Furthermore, methods for calculating and processing PDCP data volume according to embodiments will be described.

Embodiment 1: Transmitting One BSR Through Two Different Carriers in One Transmission Unit (TTI)

A typical MAC entity is required to transmit one Regular/Periodic BSR at most in one transmission time interval (TTI). However, when a radio bearer is configured for supporting PDCP duplicate transmission, it may be difficult to transmit reliably a buffer status for two logical channels associated with the radio bearer.

For example, a BSR may be triggered when a radio bearer is configured for supporting PDCP duplicate transmission, or when PDCP duplicate transmission of the radio bearer is started/activated by L2 signaling (MAC CE or PDCP control PDU) of the base station.

For another example, a BSR may be triggered according to a typical BSR triggering criterion when a radio bearer is configured for supporting PDCP duplicate transmission, or when PDCP duplicate transmission of the radio bearer is started/activated by L2 signaling (MAC CE or PDCP control PDU) of the base station.

For example, two logical channels associated with the radio bearer may be instructed to be included in different logical channel groups from each other. When a Regular BSR or a Periodic BSR is triggered for each of two logical channels/two logical channel groups which is included in different logical channel groups (LCG) from each other and which is associated with the radio bearer, a Long BSR maybe reported, if one or more LCGs have data available for transmission in a TTI in which the BSR is transmitted. Accordingly, when each logical channel associated with the radio bearer is included in logical channel groups different from one another, a BSR including buffer status information of each logical channel group may be transferred to a base station.

The BSR including the buffer status information of each logical channel group may be transmitted through each cell/carrier exclusive to another associated with each logical channel belonging to the radio bearer in one TTI.

For example, each scheduling request (SR) may be triggered over each carrier exclusive to another. As another example, when a radio bearer is configured for supporting PDCP duplicate transmission and for enabling the BSR to be transmitted over each carrier exclusive to another, the base station that has received the SR may allocate an UL resource enabling the BSR to be transmitted over each carrier exclusive to another. As further another example, when PDCP duplicate transmission of the radio bearer is started/activated by L2 signaling (MAC CE or PDCP control PDU) of the base station for enabling the BSR to be transmitted over each carrier exclusive to another, the base station that has received the SR may allocate an UL resource for enabling the BSR to be transmitted over each cell/carrier exclusive to another.

Meanwhile, the SR may be triggered for enabling the BSR to be transmitted over each cell/carrier exclusive to another.

The SR may include information for indicating this. As another example, the base station may indicate (e.g., provide or transmit) information for representing the allowance of the SR.

The BSR including the buffer status of each logical channel group may be transmitted through one of carriers exclusive to another associated with each logical channel belonging to the radio bearer in one TTI.

Data volume available for transmission of a PDCP entity included in the buffer status report may be included in the buffer size of each logical channel group. The processing of the PDCP data volume will be described later.

Embodiment 2: Indicating (e.g., Instructing) a BSR Retransmission Timer for a Logical Channel Associated with a Radio Bearer for Providing Duplicate Transmission For a radio bearer configured for duplicate transmission, or for a radio bearer where PDCP duplicate transmission is started/activated by L2 signaling of a base station, when a UE reports a BSR to the base station, the base station may allocate UL grant based on this. If a MAC PDU including the BSR is lost, for two logical channels associated with the radio bearer, it may be difficult to perform reliable transmission with low latency when UL data are available for transmission.

For example, the base station may set a RetxBSR-Timer dedicated to the radio bearer (for each radio bearer). As another example, the base station may set a RetxBSR-Timer dedicated to the radio bearer (for each radio bearer) as a value other than a typical retransmission BSR timer value (sf320, sf640, sf1280, sf2560, sf5120, sf10240) or a specific value. For another example, the UE may trigger the BSR (or transmit to the base station) when the retransmission BSR timer (retxBSR-Timer) expires.

For another example, when the timers (periodicBSR-Timer, retxBSR-Timer) are configured for each radio bearer or for each logical channel or logical channel group, there may be a multiple relationship i) for timers for each radio bearer/logical channel/logical channel group or between timers for each radio bearer/logical channel/logical channel group, or ii) between a timer for each radio bearer/logical channel/logical channel group and a UE-specific timer (commonly configured in US(s)).

Embodiment 3: Triggering a BSR when UL Data are Available for Transmission for a Logical Channel Associated with a Radio Bearer for Providing Duplicate Transmission For example, two logical channels associated with the radio bearer may be instructed to be included in an identical logical channel group.

As another example, two logical channels associated with the radio bearer may be instructed to be included in different logical channel groups from each other.

In accordance with a typical technology, when UL data are available for transmission for two logical channels associated with a radio bearer configured for duplicate transmission or a radio bearer where PDCP duplicate transmission is started/activated by L2 signaling of a base station, a Regular BSR is triggered only if either a corresponding logical channel/logical channel group belongs to a logical channel with higher priority than the priorities of logical channels for which data is already available for transmission, or there is no data available for transmission for any of the logical channels which belong to a LCG.

In this case, the BSR may not be transmitted quickly to the base station, therefore, it may be difficult to perform reliable transmission with low latency when UL data belonging to the radio bearer are generated continuously.

Accordingly, for a radio bearer configured for duplicate transmission or for a radio bearer where PDCP duplicate transmission is started/activated by L2 signaling of a base station, a UE may trigger a Regular BSR when UL data are available for transmission for two logical channels associated with the radio bearer, which may be configured in advance in the UE or signaled by the base station.

For example, the base station may transmit or provide information for indicating this to the UE through RRC signaling. As another example, in case the base station indicates a PeriodicBSR-Timer as a specific value (e.g., 0), the UE may trigger a Regular BSR when UL data are available for transmission for the radio bearer. As another example, the base station may set a PeriodicBSR-Timer dedicated to the radio bearer (for each radio bearer). In this case, the UE may trigger the Regular BSR when UL data are available for transmission for the radio bearer (or logical channel/logical channel group).

As another example, for a radio bearer configured for duplicate transmission or for a radio bearer where PDCP duplicate transmission is started/activated by L2 signaling of a base station, the UE may trigger the Regular BSR when UL data available for transmission are larger than or equal to a threshold value (or larger than) that is indicated by the UE for two logical channels associated with the radio bearer. To this end, the base station may indicate the threshold value for the radio bearer or logical channel to the UE.

Embodiment 4: Processing a Padding BSR (or Duplicate Transmission BSR) at a Higher Priority when UL Data are Available for Transmission for a Logical Channel Associated with a Radio Bearer for Providing Duplicate Transmission In the typical technology, for the Logical Channel Prioritization procedure, the MAC entity shall take into account the following relative priority in decreasing order.

- MAC control element for C-RNTI or data from UL-CCCH;
- MAC control element for DPR;
- MAC control element for SPS confirmation;
- MAC control element for BSR, with exception of BSR included for padding;
- MAC control element for PHR, Extended PHR, or Dual Connectivity PHR;
- MAC control element for Sidelink BSR, with exception of Sidelink BSR included for padding;
- data from any Logical Channel, except data from UL-CCCH;
- MAC control element for Recommended bit rate query;
- MAC control element for BSR included for padding;
- MAC control element for Sidelink BSR included for padding.

Thus, the MAC CE for the BSR included in the padding has lower priority than data from any logical channel.

When UL data becomes available for transmission for two logical channels associated with a radio bearer configured for duplicate transmission or a radio bearer where PDCP duplicate transmission is started/activated by L2 signaling of a base station, it is necessary to transmit a BSR quickly if UL data which belong to the radio bearer are generated continuously. To this end, a MAC CE for a BSR included in padding may be considered to have higher priority. For example, a MAC CE for a BSR included in the padding may be configured to have higher priority than data from any logical channel. As another example, the priority of a MAC CE for a BSR included in the padding may be configured to be higher than the priority described above.

Alternatively, in case a Padding BSR is included, a MAC PDU may be transmitted to a base station, not including an additional Padding BSR. As another example, even if a Padding BSR is included, a MAC PDU may be transmitted to a base station, including an additional Padding BSR.

Alternatively, when UL data becomes available for transmission for two logical channels associated with a radio bearer configured for duplicate transmission or a radio bearer where PDCP duplicate transmission is started/activated by L2 signaling of a base station, a BSR may be defined for transmitting UL data which belong to the radio bearer and available for transmission. A MAC CE for the BSR may be considered to have higher priority. For example, the MAC CE for the BSR may be considered to have higher priority than data from any logical channel. As another example, the priority of the MAC CE for the BSR may be considered to be higher than the priority described above. As another example, the priority of the MAC CE for the BSR may be considered to be equal to or higher than the MAC control element for BSR, with exception of BSR included for padding.

Embodiment 5: Reporting a Buffer Status for Only One Logical Channel for a Logical Channel Associated with a Radio Bearer for Providing Duplicate Transmission For a radio bearer configured for duplicate transmission or a radio bearer where PDCP duplicate transmission is started/activated by L2 signaling of a base station, when a UE reports a BSR to the base station, the base station may allocate UL grant based on this. The base station has information on a logical channel/logical channel group which belongs to the radio bearer and information on a carrier associated with the logical channel and exclusive to another. Accordingly, the base station may allocate UL grant even if, without a separate buffer status report for each logical channel/logical channel group which belongs to the radio bearer, the base station receives a buffer status for one of two logical channels. This is applicable to a logical channel group in a case where only one radio bearer is included in the logical channel group or only a radio bearer configured/activated for duplicate transmission is included in the logical channel group. When an RLC packet is lost on individual carrier, there is a possibility that a buffer status for each logical channel may differ, but this probability may not be significant in case only one of two transmissions is successfully transmitted.

Thus, for example, a UE may transmit, to a base station, a buffer status for only one logical channel (or a first logical channel, a default logical channel, a logical channel including a PCell, or a logical channel associated with a first RLC entity) in a corresponding bearer. As another example, a UE may transmit, to a base station, only data available for transmission for UL data of one logical channel (or a first logical channel, a default logical channel, a logical channel including a PCell, or a logical channel associated with a first RLC entity) in a corresponding bearer. As still another example, a UE may not consider, as BSR to be triggered, data available for transmission for UL data of a logical channel (or a second logical channel, a logical channel not including a PCell, or a logical channel associated with a second RLC entity) other than the above logical channel in a corresponding bearer. As yet another example, for UL data of a logical channel (or a second logical channel, a logical channel not including a PCell, or a logical channel associated with a second RLC entity) other than the above logical channel in a corresponding bearer, a UE may enable an RRC entity i) not to indicate this to a MAC entity or ii) to ignore indicated data available for transmission. As yet another example, a field for distinguishing a duplicate DSR from others may be included in specific indication information (e.g., logical channel identity (LCID), an index value, a distinct value, or the like). As yet another example, a buffer status report for a single logical channel may be transmitted using a Short BSR as the BSR.

Embodiment 6: Maintaining a Triggered BSR or Transmitting at Next UL Grant for a Logical Channel/Logical Channel Group Associated with a Radio Bearer for Providing Duplicate Transmission In the typical technology, when one BSR is included in one MAC PDU for transmission, all triggered BSRs are canceled. However, in case the number of logical channel groups increases, it may be needed to modify such BSR canceling. The reason is that, in case only a BSR for one logical channel group is transmitted through a Short BSR or a Truncated BSR, it may not be easy for a base station to identify a BSR of remaining logical channel group(s). Therefore, there is a possibility that mismatch between a UE and a base station may occur, and as a result, there is a possibility that base station may not effectively allocate an UL resource.

For example, in case the number of logical channel groups is less than a predetermined value, all triggered BSR may be canceled when one BSR is included in one MAC PDU for transmission. The predetermined value may be set (or fixed) in advance in a UE or informed a base station.

For another example, in case the number of logical channel groups is larger than a predetermined value, a remaining BSR (or a triggered specific BSR except for a transmitted BSR) except for the transmitted BSR may be maintained even if one BSR is included in one MAC PDU for transmission. Thereafter, the corresponding BRS may be transmitted when UL grant is received in a next TTI or within a specified number of TTIs.

As another example, for a radio bearer configured for duplicate transmission or a radio bearer where PDCP duplicate transmission is started/activated by L2 signaling of a base station, for a logical channel/logical channel group of the radio bearer, a remaining BSR (or a triggered specific BSR that includes the logical channel/logical channel group of the radio bearer except for a transmitted BSR) except for the transmitted BSR may be maintained even if one BSR is included in one MAC PDU for transmission. Thereafter, the corresponding BRS may be transmitted when UL grant is received in a next TTI or within a specified number of TTIs.

Hereinafter, embodiments will be described based on a case in which one radio bearer supports duplicate transmission through two RLC entities. This is for convenience of description and ease of understanding. The embodiments may be applicable to various MAC entities and RLC entities described with reference to FIGS. 5 to 13.

As described above, a base station may configure two RLC entities associated with one radio bearer for duplicate transmission for a UE. The base station may configure two RLC entities associated with one radio bearer for duplicate transmission, which are a basic/default RLC entity and an additional RLC entity, for the UE. Hereinafter, for convenience of description and ease of understanding, a basic/default RLC entity associated with a radio bearer is referred to as a first RLC entity, and an RLC entity added for duplicate transmission is referred to as a second RLC entity, Meanwhile, hereinafter, methods for calculating or processing data available for transmission or data volume according to embodiments will be described.

A buffer status reporting procedure is used to provide, to a serving base station, information on data available for transmission or data volume in UL buffers of a UE associated with a MAC entity of the base station. Thereafter, for convenience of description and ease of understanding, data available for transmission or data volume in UL buffers of a UE is referred to as "available data", "transmittable data volume" or "data volume".

For MAC buffer status reporting, a UE is required to consider the following as data available for transmission in the RLC layer.

RLC SDUs, or segments thereof, that have not yet been included in an RLC data PDU RLC data PDUs, or portions thereof, that are pending for retransmission (RLC AM), RLC data PDUs, or portions thereof, that are pending for initial transmission For MAC buffer status reporting in the typical technology, a UE is required to consider PDCP control PDUs and the following as data available for transmission in the PDCP layer.

For SDUs for which no PDU has been submitted to lower layers the SDU itself, if the SDU has not yet been processed by PDCP, or the PDU if the SDU has been processed by PDCP PDCP control PDUs Thus, PDCP SDUs and PDCP data PDUs corresponding to user data and PDCP control PDUs used for controlling user data in the PDCP layer are used for calculating available PDCP data volume.

In addition, for a radio bearer mapped on an RLC acknowledged mode (AM), if a PDCP entity has performed a reconfiguration procedure, a UE is required to consider the following as data volume (PDCP data volume) available for transmission in the PDCP layer.

Except for SDUs, successful transfer of which is indicated by a PDCP status report, for SDUs for PDUs that has been submitted to lower layers before PDCP reconfiguration, starting from a first SDU for transferring corresponding PDUs that have not been acknowledged by the lower layer SDU, if has not yet been processed by PDCP the PDU if the SDU has been processed by PDCP If a PDCP provides duplicate transmission, data available for transmission may be processed in a UE using individually embodiments described above or in combination with one or more embodiments or examples. This may be applicable to, as well as a case in which duplicate transmission is performed through a plurality of carriers based on CA in a single base station, a case in which duplicate transmission is performed through a plurality of cells based on dual connectivity.

Embodiment 1: Indicating Data Available for Transmission by Duplicate (Multiple) of PDCP Data Volume, in Case Duplicate Transmission is Activated A base station may configure one PDCP entity and two RLC entities associated with the PDCP entity for one radio bearer for duplicate transmission for a UE.

For the one radio bearer for providing the duplicate transmission, when indicating data available for transmission (data volume) to a MAC entity for BSR triggering and buffer size calculating, a UE may operate as follows.

For example, when a condition/threshold for duplicate transmission is configured, and when the duplicate transmission condition is satisfied (or a duplicate transmission condition parameter is larger than or equal to a duplicate transmission threshold value, or information for indicating by the physical layer that the duplicate transmission condition is satisfied is received), the UE (PDCP entity of the UE) indicates two times data buffered in the PDCP entity as data available for transmission to the MAC entity. For example, n times data buffered in a PDCP entity for duplicate transmission may be indicated through n radio paths through n logical channels.

As another example, when radio bearer indication information is configured by a base station, and when L2 signaling (e.g., MAC CE) for activating the duplicate transmission is received from the base station, the UE (PDCP entity of the UE) indicates two times data buffered in the PDCP entity as data available for transmission to the MAC entity. For example, the L2 signaling may be information for instructing the duplicate transmission to be activated based on a control PDU defined by the RLC layer (or a first RLC entity). As another example, the L2 signaling may be information for instructing the duplicate transmission to be activated based on a control PDU defined by the PDCP layer (or a PDCP entity). As further another example, the L2 signaling may be information for instructing the duplicate transmission to be activated i) based on a control PDU defined by the MAC layer (or an MCG MAC entity) or ii) through a MAC control element (with a new LCID). The MAC control element may include i) radio bearer identification information or logical channel identification information for a logical channel, for activating the duplicate transmission, or ii) activation/deactivation identification information of the radio bearer or the logical channel.

As another example, as shown in FIG. 8, in case a UE provides PDCP duplicate transmission using one MAC entity based on CA in a single base station, in the above condition, the UE (the PDCP entity of the UE) may indicate (e.g., instruct or inform) two times the whole data buffered in the PDCP entity as data available for transmission to the MAC entity. For example, PDCP data volume of one or more logical channels associated with a first RLC entity may be indicated (e.g., instructed) to the corresponding MAC entity, including data volume for PDCP SDUs, PDCP data PDUs, and PDCP control PDUs. Further, PDCP data volume of one or more logical channels associated with a second RLC entity may be also indicated (e.g., instructed) to the corresponding MAC entity, including data volume for PDCP SDUs, PDCP data PDUs, and PDCP control PDUs. That is, the data volume for the whole PDCP data including PDCP SDUs, PDCP data PDUs, and PDCP control PDUs may be included for calculating each of the PCDP Data volume of one or more logical channels associated with the first RLC entity and the PCDP Data volume of one or more logical channels associated with the second RLC entity.

As another example, for SDUs for which no PDU has been submitted to lower layers, the SDU itself, if the SDU has not yet been processed by PDCP, two times calculated PDCP available data may be indicated.

the PDU if the SDU has been processed by PDCP, data available for transmission of a PDU data PDU may be indicated.

for a PDCP control PDU, data available for transmission of the PDCP control PDU may be indicated.

The PDCP available data calculated by the above methods may be indicated (e.g., informed) to a MAC entity. Accordingly, in case a PDCP PDU is copied by the PDCP, since the data volume has already been calculated twice, SDU data volume is doubled, but PDCP PDU data volume may be indicated to (or informed) a MAC entity of the UE without being doubled, namely, as is. In addition, PDCP control PDUs used for user data control are not required to perform the duplicate transmission. Therefore, corresponding data volume may be indicated as it is, for the PDCP control PDUs other than user data. That is, the duplicate transmission is to provide ultra-reliable and low latency service for user data. Accordingly, PDCP control PDUs for controlling user data may be transmitted through a cell/cell group associated with a first cell or a first RLC entity. For example, PDCP data volume of one or more logical channels associated with a first RLC entity may be indicated (e.g., informed) to a corresponding MAC entity, including PDCP data volume for PDCP SDUs, PDCP data PDUs, and PDCP control PDUs. For example, PDCP data volume of one or more logical channels associated with a second RLC entity may be indicated (e.g., informed) to a corresponding MAC entity, including only PDCP data volume for PDCP SDUs. That is, the PDCP data volume of one or more logical channels associated with the second RLC entity may be indicated (e.g., informed) to the corresponding MAC entity, excepting PDCP data volume for PDCP data PDUs and PDCP control PDUs.

As another example, for SDUs for which no PDU has been submitted to lower layers, the SDU itself, if the SDU has not yet been processed by PDCP, two times calculated data available for transmission of the PDCP SDU may be indicated.

if the SDU is being processed and has not yet been copied/duplicated by PDCP, two times data available for transmission of a PDU data PDU calculated by the SDU (or PDU) may be indicated.

the PDU if the SDU has been processed by PDCP, or if the SDU has been processed and has been copied/duplicated by the PDCP, or there is a duplicate PDU before being indicated (e.g., informed) to a lower layer by the PDCP, data available for transmission of the PDU may be indicated.

for a PDCP control PDU, data/data volume available for transmission of the PDCP control PDU may be indicated (e.g., informed or instructed).

The PDCP available data calculated by the above methods may be indicated (e.g., informed) to a MAC entity. This may mean that the PDCP duplicate function is a function provided by the PDCP. For example, if there is a copied/duplicated PDU when PDCP data volume is calculated, when calculating the PDCP data volume, it is necessary to process a PDCP PDU that is not copied/duplicated and a copied/duplicated PDCP PDU individually. If a PDCP PDU for user data is copied/duplicated when being submitted to a lower layer, when calculating PDCP data volume, it may be necessary to process separately the PDCP PDU from the copied/duplicated PDCP PDU. Accordingly, when PDCP PDUs are submitted to a lower layer by the PDCP, if the PDCP PDUs are copied/duplicated, two times data volume for the PDCP PDUs (or PDCP SDUs) may be indicated until the PDCP PDUs for user data are copied/duplicated. However, data volume for a PDCP control PDU other than user data may be indicated (e.g., informed) to a MAC entity of the UE as is. For example, PDCP data volume of one or more logical channels associated with a first RLC entity may be indicated (e.g., informed) to a corresponding MAC entity, including PDCP data volume for PDCP SDUs, PDCP data PDUs, and PDCP control PDUs. For example, PDCP data volume of one or more logical channels associated with a second RLC entity may be indicated to a corresponding MAC entity, including PDCP data volume for PDCP SDUs and PDCP data PDUs. That is, the PDCP data volume of one or more logical channels associated with the second RLC entity may be indicated (e.g., informed) to the corresponding MAC entity, excepting PDCP data volume for PDCP control PDUs.

As another example, in case a UE provides PDCP duplicate transmission using two MAC entities based on DC in two base stations, in the above condition, the UE (the PDCP entity of the UE) may indicate (e.g., inform) data volume available for transmission buffered in the PDCP entity as data available for transmitting to each MAC entity.

Embodiment 2: Indicating (e.g., Informing or Instructing) Existing Data Volume as Data Available for Transmission when Duplicate Transmission Radio Bearer is Deactivated A base station may configure one PDCP entity and two RLC entities associated with the PDCP entity for one radio bearer for duplicate transmission for a UE.

For the one radio bearer for providing the duplicate transmission, when indicating (e.g., informing) data available for transmission (data volume) to a MAC entity for BSR triggering and buffer size calculating, a UE may operate as follows.

For example, when a condition/threshold for duplicate transmission is configured, and the duplicate transmission condition is not satisfied (or i) a duplicate transmission condition parameter is less than or equal to a duplicate transmission threshold value, ii) information for indicating by the physical layer that the duplicate transmission condition is not satisfied is received, or iii) information for indicating by the physical layer that the duplicate transmission condition is satisfied is not received), the UE (PDCP entity of the UE) indicates data buffered in the PDCP entity as data available for transmission to the MAC entity. For another example, when radio bearer indication information is configured by a base station, and i) L2 signaling for activating the duplicate transmission is not received from the base station, ii) L2 signaling for deactivating the duplicate transmission is received from the base station, or iii) signaling for releasing/deactivating the duplicate transmission is received from the base station, the UE (PDCP entity of the UE) indicates data buffered in the PDCP as data available for transmission to the MAC entity. That is, in case CA is configured based on a single base station, unless duplicate transmission is configured and activated for a UE, for example, i) when the duplicate transmission is not configured, ii) when the duplicate transmission not activated even if configured, the UE (the PDCP entity of the UE) may indicate data volume buffered in the PDCP entity as data available for transmission to a MAC entity (a MAC entity associated with a first RLC entity) as is.

As another example, as shown in FIG. 8, in case a UE provides PDCP duplicate transmission using one MAC entity based on CA in a single base station, in the above condition, the UE (the PDCP entity of the UE) may indicate (e.g., inform) data available for transmission buffered in the PDCP as data available for transmission to the MAC entity (a MAC entity associated with a first RLC entity).

Embodiment 3: Indicating Data Available for Transmission of a Second RLC Entity Depending on Whether a Duplicate Transmission Bearer is Activated For example, as shown in FIG. 8, in case a UE provides PDCP duplicate transmission using one MAC entity based on CA in a single base station, data available for transmission of a second RLC entity may be indicated depending on whether a duplicate transmission bearer is activated. For example, when radio bearer indication information is configured by a base station, and when L2 signaling for activating the duplicate transmission is not received from the base station, the UE (PDCP entity of the UE) indicates (e.g., informs) data buffered in the PDCP as data available for transmission to the MAC entity. As another example, when a condition/threshold for duplicate transmission is configured, and when the duplicate transmission condition is satisfied (or a duplicate transmission condition parameter is larger than or equal to a duplicate transmission threshold value, or information for indicating by the physical layer that the duplicate transmission condition is satisfied is received), the UE (a second RLC entity of the UE) indicates (e.g., informs) data available for transmission buffered in the second RLC entity as data available for transmission to a MAC entity.

As another example, when a condition/threshold for duplicate transmission is configured, but the duplicate transmission condition is not satisfied (or i) a duplicate transmission condition parameter is less than or equal to a duplicate transmission threshold value, ii) information for indicating by the physical layer that the duplicate transmission condition is not satisfied is received, or iii) information for indicating by the physical layer that the duplicate transmission condition is satisfied is not received), the UE (a second RLC entity of the UE) indicates (e.g., informs) 0 (zero) as data available for transmission to a MAC entity. Alternatively, the UE does not indicate (e.g., inform).

As another example, when radio bearer indication information is configured by a base station, and i) L2 signaling for activating the duplicate transmission is not received from the base station, ii) L2 signaling for deactivating the duplicate transmission is received from the base station, or iii) signaling for releasing/deactivating the duplicate transmission is received from the base station, the UE (a second RLC entity of the UE) indicates (e.g., informs) 0 (zero) as data available for transmission to a MAC entity. Alternatively, the UE does not indicate (e.g., inform).

Embodiment 4: Indicating DCP Data Volume as is as Data Available Even for a Duplicate Transmission Bearer A MAC entity may include PDCP data volume on each logical channel/logical channel group associated with a corresponding radio bearer and then calculate the size of one or more buffers.

A base station may configure one PDCP entity and two RLC entities associated with the PDCP entity for one radio bearer for duplicate transmission for a UE. The base station may transmit, to the UE, information for instructing the duplicate transmission to be activated/deactivated for the radio bearer configuring the duplicate transmission. Accordingly, when calculating UL buffer volume for a specific bearer, the base station may perform UL scheduling taking this into account. Thus, even if the UE configures indication information for a duplicate transmission radio bearer, PDCP available data volume may be indicated as is. Alternatively, when performing buffer status reporting and calculating a buffer status size of a radio bearer for corresponding duplicate transmission, a MAC entity may calculate the buffer status size of the corresponding radio bearer taking into account whether the duplicate transmission is activated.

For example, when a condition/threshold for duplicate transmission is configured, and the duplicate transmission condition is satisfied (or a duplicate transmission condition parameter is larger than or equal to a duplicate transmission threshold value, or information for indicating by the physical layer that the duplicate transmission condition is satisfied is received), the UE (PDCP entity of the UE) indicates (e.g., informs) data buffered in the PDCP entity as data available for transmission to the MAC entity. The MAC doubles data available for transmission of the PDCP entity corresponding to buffer status reporting and calculates the buffer status. That is, each of a buffer status of a first logical channel and a buffer status of a second logical channel associated with the corresponding radio bearer is calculated, including (e.g., informing) the data volume available for transmission of the PDCP entity.

As another example, when radio bearer indication information is configured by a base station, and L2 signaling for activating the duplicate transmission is received from the base station, the UE (PDCP entity of the UE) indicates (e.g., informs) data buffered in the PDCP entity as data available for transmission to the MAC entity. The MAC doubles data available for transmission of the PDCP entity corresponding to buffer status reporting and calculates the buffer status. That is, each of a buffer status of a first logical channel and a buffer status of a second logical channel associated with the corresponding radio bearer is calculated, including the data volume available for transmission of the PDCP entity.

As another example, as shown in FIG. 8, in case a UE provides PDCP duplicate transmission using one MAC entity based on CA in a single base station, the UE (the PDCP entity of the UE) may indicate (e.g., inform) data volume buffered in the PDCP entity as data available for transmission to the MAC entity. The MAC doubles data available for transmission of the PDCP entity corresponding to buffer status reporting and calculates the buffer status. That is, each of a buffer status of a first logical channel and a buffer status of a second logical channel associated with the corresponding radio bearer is calculated, including the data volume available for transmission of the PDCP entity.

For example, each of two logical channels associated with one radio bearer may be processed, including the data volume available for transmission of the PDCP entity. The UE may transmit, to the base station, a buffer size including PDCP data volume on each logical channel or logical channel group associated with one radio bearer.

Hereinafter, a procedure for reporting a buffer status by indicating the PDCP data volume to the MAC according to embodiments will be described. To understand clearly the description discussed above, RRC configuration parameters configured by a base station to a UE are described first.

To configure/update RRC connection, for example, to configure/modify/release a radio bearer or add/modify/release a Scell and a cell group, an RRC connection reconfiguration message may include one or more of master cell group configuration information, secondary cell group configuration information, radio bearer configuration information, dedicated NAS configuration information (dedeicatedInfoNAS), measurement configuration information, and other configuration information.

FIG. 16 is a diagram illustrating radio bearer configuration information according to embodiments of the present disclosure. FIG. 17 is a diagram illustrating cell group configuration information according to embodiments of the present disclosure.

Referring to FIGS. 16 and 17, radio bearer configuration information may include one or more of signaling radio bearer (SRB) configuration information (e.g. srb-ToAddModList), data radio bearer (DRB) configuration information (e.g. drb-ToAddModList) and security configuration information (e.g. securityConfig).

The SRB configuration information (e.g. srb-ToAddMod) and the DRB configuration information (e.g. drb-ToAddMod) may include PDCP configuration information. In the typical technology, a PDCP entity and an RLC entity associated with the PDCP entity configured on a radio bearer can be identified through radio bearer type information. However, in the NR, the introduction of a SCG split bearer, or the like has caused more radio bearer types to be defined than the LTE, resulting in radio bearer reconfiguration procedure, or the like being more complicated. As a method of addressing these issues, RRC signaling information may be design for a higher layer configuration (e.g., bearer configuration including PDCP and SDAP) and a lower layer configuration (e.g., MCG/SCG configuration including RLC and MAC) individually in radio bearer configuration information.

Cell group configuration information may include master cell group (master node) configuration information or secondary cell group (secondary node) configuration information. A base station indicates (e.g., inform) configuration parameters for one cell group to a UE through a cell group configuration information element (CellGroupConfig IE). The cell group configuration information may be identified as an MCG and a SCG through a cell group identifier. For example, if the cell group identifier is not included, the cell group configuration information may represent to the MCG, otherwise the cell group configuration information may represent to the SCG. As another example, the cell group configuration information may include parameters for distinguishing the MCG and the SCG.

The cell group configuration information may include one or more of logical channel configuration information (e.g. logicalChannel-ToAddModList), MAC cell group configuration information (e.g. ac-CellGroupConfig), RLF timer configuration information (e.g. rlf-TimersAndConstants), PCell configuration information (e.g. pCellConfig) and SCell configuration information (e.g. sCellToAddModList).

In case RRC signaling information is designed as described above, it is necessary to indicate mapping/association information between a PDCP entity included in radio bearer configuration information which is higher layer configuration information and an RLC entity included in cell group configuration information which is lower layer configuration information.

For example, in case duplicate transmission is configured based on CA, for a PDCP entity included in the radio bearer configuration information, information for indicating an additional RLC entity associated with the PDCP entity may be included in PDCP configuration information. In case duplicate transmission is not configured based on CA, for a PDCP entity included in the radio bearer configuration information, such information for indicating the additional RLC entity denotes information distinguished from information for indicating a basic RLC entity with the PDCP entity in the PDCP configuration information. As described above, in case duplicate transmission is configured based on CA, one radio bearer is configured through two logical channels associated with cells that do not overlap each other and two RLC entities associated with each of the logical channels. Accordingly, information for indicating corresponding RLC entities may be associated using a logical channel identifier (logicalchannelIdentity). Additionally, the PDCP configuration information may include information for indicating a duplicate transmission configuration.

As another example, in case duplicate transmission is configured based on CA, logical channel configuration information (LCH-Config) included in the cell group configuration information may include information (RLC-config) for indicating the configuration of RLC entities associated with corresponding logical channels. Additionally, the logical channel configuration information (LCH-Config) may include radio bearer identification information associated with the corresponding logical channel(s), or cell information (allowedCells) or cell list information, allowed for the logical channel(s).

As described above, a UE may process data (data volume) available for transmission of a PDCP entity differently according to the number of associated RLC entities, whether PDCP duplicate transmission is configured and/or activated, and whether data duplicate transmission is configured/activated based on CA.

For example, the UE (or the PDCP entity of the UE) may process PDCP available data as follows.

If a transmitting PDCP entity is associated with one RLC entity (or associated with one logical channel or configured being associated with only one RLC entity), the UE (or the PDCP entity of the UE) may indicate (e.g., inform) PDCP data volume to a corresponding MAC entity. This represents that the PDCP entity of the UE indicates PDCP data volume to a MAC entity associated with the first RLC entity.

Otherwise, if the transmitting PDCP entity is associated with two RLC entities (or associated with two logical channels), when PDCP duplicate transmission (pdcp-Duplication) is configured and activated, and when logical channels different from each other for the duplicate transmission are included in an identical MAC entity, the UE (or the PDCP entity of the UE) may indicate (e.g., inform) PDCP data volume for each of two logical channels associated with the MAC entity to the corresponding MAC entity. As another example, the UE (or the PDCP entity of the UE) may indicate (e.g., inform) two times PDCP data volume to the corresponding MAC entity. As another example, the UE may indicate (e.g., inform) two logical channel identification information associated with to the MAC entity and PDCP data volume to the MAC corresponding entity. As another example, the UE (or the PDCP entity of the UE) may indicate (e.g., inform) PDCP data volume to the corresponding MAC entity. As another example, the UE (or the PDCP entity of the UE) may indicate (e.g., inform) PDCP data volume of a first logical channel associated with a first RLC entity to an associated MAC entity and indicate (e.g., inform) PDCP data volume of a second logical channel associated with a second RLC entity the associated MAC entity or another associated MAC entity. At this time, the UE (or the PDCP entity of the UE) may calculate a BSR buffer size including corresponding PDCP data volume for each of the associated two logical channels.

Otherwise, if a transmitting PDCP entity is associated with two RLC entities (or associated with two logical channels), when PDCP duplicate transmission (pdcpDuplication) is configured and activated, and logical channels different from each other for the duplicate transmission are included in MAC entities different from each other, the UE (or the PDCP entity of the UE) may indicate (e.g., inform) PDCP data volume to both the MCG MAC entity and the SCG MAC entity. As another example, the UE (or the PDCP entity of the UE) may indicate (e.g., inform) PDCP data volume of a first logical channel associated with a first RLC entity to a first MAC entity associated with the first logical channel and indicate (e.g., inform) PDCP data volume of a second logical channel associated with a second RLC entity to a second MAC entity associated with the second logical channel.

Otherwise, if a transmitting PDCP entity is associated with two RLC entities (or associated with two logical channels), when PDCP duplicate transmission (pdcpDuplication) is configured but not activated, and logical channels different from each other for the duplicate transmission are included in an identical MAC entity, the UE (or the PDCP entity of the UE) may indicate (e.g., inform) PDCP data volume to the corresponding MAC entity. As another example, the UE (or the PDCP entity of the UE) may indicate (e.g., inform) PDCP data volume to the MCG MAC entity. As another example, the UE (or the PDCP entity of the UE) may indicate (e.g., inform) PDCP data volume to a MAC entity associated with the first RLC entity. As another example, the UE (or the PDCP entity of the UE) may indicate (e.g., inform) PDCP data volume for one logical channel associated with a MAC entity to the corresponding MAC entity.

If a transmitting PDCP entity is associated with two RLC entities (or associated with two logical channels), when PDCP duplicate transmission (pdcpDuplication) is configured but not activated, and when logical channels different from each other for the duplicate transmission are included in MAC entities different from each other, the UE (or the PDCP entity of the UE) may indicate (e.g., inform) PDCP data volume to the corresponding MAC entity. As another example, the UE (or the PDCP entity of the UE) may indicate (e.g., inform) PDCP data volume to the MCG MAC entity. As another example, the UE (or the PDCP entity of the UE) may indicate (e.g., inform) PDCP data volume to a MAC entity associated with the first RLC entity.

If a transmitting PDCP entity is associated with two RLC entities (or associated with two logical channels), when PDCP duplicate transmission (pdcpDuplication) is not configured, and when the whole PDCP data volume that is pending for initial transmission in two associated RLC entities and RLC data volume are less than an UL data split threshold value (ul-DataSplitThreshold) (or when PDCP data volume is less than an UL data split threshold value (ul-DataSplitThreshold)), the UE (or the PDCP entity of the UE) may indicate (e.g., inform) PDCP data volume to a corresponding MAC entity. As another example, the UE (or the PDCP entity of the UE) may indicate (e.g., inform) PDCP data volume to a MAC entity configured with an UL path. As another example, the UE (or the PDCP entity of the UE) may indicate (e.g., inform) PDCP data volume to an associated MAC entity. As another example, the UE (or the PDCP entity of the UE) may indicate (e.g., inform) PDCP data volume to a MAC entity associated with the associated RLC entity. As another example, the UE (or the PDCP entity of the UE) may indicate (e.g., inform) PDCP data volume to a MAC entity including an associated logical channel. As another example, the UE (or the PDCP entity of the UE) may indicate (e.g., inform) PDCP data volume to a MAC entity associated with the first RLC entity.

As another example, the UE (or the PDCP entity of the UE) may indicate (e.g., inform) PDCP data volume as 0 (zero) to another MAC entity. As another example, the UE (or the PDCP entity of the UE) may indicate (e.g., inform) PDCP data volume as 0 (zero) to a MAC entity associated with a second RLC entity.

If a transmitting PDCP entity is associated with two RLC entities (or associated with two logical channels), when PDCP duplicate transmission (pdcpDuplication) is not configured, and when the whole PDCP data volume that is pending for initial transmission in two associated RLC entities and RLC data volume are larger than an UL data split threshold value (ul-DataSplitThreshold) (or when PDCP data volume is larger than an UL data split threshold value (ul-DataSplitThreshold)), the UE (or the PDCP entity of the UE) may indicate (e.g., inform) PDCP data volume to both the MCG MAC entity and the SCG MAC entity. As another example, the UE (or the PDCP entity of the UE) may indicate (e.g., inform) PDCP data volume to a MAC entity associated with a first RLC entity and a MAC entity associated with a second RLC entity.

As described above, in accordance with embodiment of the present disclosure, when duplicate transmission is configured or activated based on CA by a single base station for a specific bearer, it is possible for a UE to provide effectively buffer status reporting, enabling a base station to perform effectively UL resource allocation.

Hereinafter, configurations of a UE and a BS capable of performing a part or all of the embodiments described with reference to FIGS. 1 to 17 will be discussed with reference to the drawings.

Figure 18:
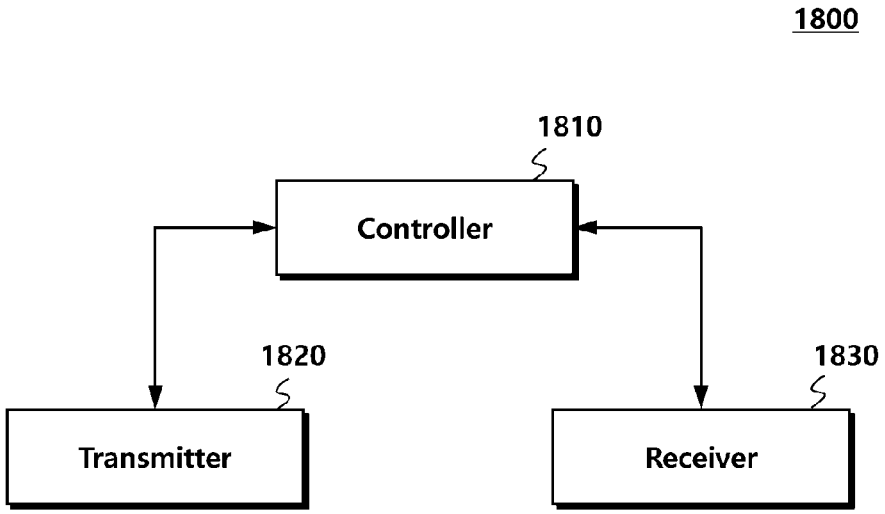
FIG. 18 is a block diagram illustrating a user equipment according to embodiments of the present disclosure.

FIG. 18 is a block diagram illustrating a UE according to embodiments of the present disclosure.

Referring to FIG. 18, a UE 1800 is configured with carrier aggregation (CA) and transmits a buffer status report. The UE 1800 includes: a receiver 1830 configured to receive high layer signaling including information for configuring data duplicate transmission using carrier aggregation from a base station, a controller 1810 configured to configure a plurality of RLC entities including a first radio link control (RLC) entity and a second RLC entity associated with one packet data convergence protocol (PDCP) entity based on the high layer signaling and configure a logical channel associated with the first RLC entity and a logical channel associated with the second RLC entity, to one medium access control (MAC) entity, and when the data duplicate transmission is activated, a transmitter 1820 configured to transmit, to the base station, the buffer status report configured by including PDCP data volume in both a logical channel group associated with the first RLC entity and a logical channel group associated with the second RLC entity.

For example, the receiver 1830 may configure the CA with a single base station and receive an RRC message including additional RLC configuration information for performing the duplicate transmission for identical data to the base station using the configured CA through a plurality of carriers. For example, the information for configuring the duplicate transmission may include information on a plurality of RLC entities configured in the UE for transmitting data in duplicate, logical channel information associated with each RLC entity, information for associating each RLC entity with one PDCP entity, or MAC entity configuration information for the duplicate transmission.

In addition, the controller 1810 may configure an additional RLC entity in the UE based on the received information for configuring the duplicate transmission. The additional RLC entity may be configured with a plurality of RLC entities according to the configuration of the base station. The controller 1810 may configure the first RLC entity and the second RLC entity to be associated with one PDCP entity, depending on high layer signaling. In addition, in order for one MAC entity to distinguish between a typical RLC entity and the additional RLC entity, the controller 1810 may configure (e.g., form) one or more logical channels to be associated with the RLC entities. That is, the controller 1810 may form the logical channel corresponding associated with the first RLC entity and the logical channel associated with the second RLC entity to the MAC entity. Through this, the MAC entity may map data transmitted/received through one radio bearer to respective logical channels. Therefore the MAC entity may perform the duplicate transmission of PDCP data to the base station through a plurality of RLC entities or may transfer data received in duplicate to the PDCP entity through respective logical channels.

The transmitter 1820, such as the MAC entity, may transmit respective data transferred through the logical channel associated with the first RLC entity and the logical channel associated with the second RLC entity to the base station through different carriers from each other. The first RLC entity and the second RLC entity may be configured to be associated with different logical channels from each other based on a logical channel identifier. Alternatively, the first RLC entity and the second RLC entity may be configured to be associated with one PDCP entity based on a radio bearer identifier.

When duplicate transmission configuration, such as a plurality of RLC entities, is completed and when a data duplicate function is activated, the transmitter 1820 may transmit a buffer status report to the base station depending on a buffer status report triggering condition. It is noted that even when the duplicate transmission is configured for the UE, the data duplicate function may be not activated depending on configurations. In this case, the activation of the duplicate transmission may be indicated through a separate signal from the base station. For example, the signal for the activation of the duplicate transmission may be indicated through a MAC control element for each data radio bearer from the base station. That is, the base station may activate or deactivate the data duplicate function configured in the UE for each radio bearer through the MAC control element.

For example, the controller 1810 may configure the PDCP data volume to be included in both a logical channel group associated with the first RLC entity and a logical channel group logical channel associated with the second RLC entity. In this case, the transmitter 1820 may transmit a buffer status report including buffer information of each logical channel group to the base station. That is, the PDCP data volume may be configured to be included in all logical channel groups associated with each RLC entity.

In addition, the controller 1810 may process information for configuring the duplicate transmission, information for indicating the activation of the duplicate transmission, or data for the duplicate transmission.

In addition, the controller 1810 controls overall operations of the UE 1800 for configuring with CA based on a single base station, transmitting/receiving data in duplicate through a plurality of carriers, and processing a buffer status report, according to performing embodiments described above. In addition, the receiver 1830 receives DL control information, data, and messages from the base station through a corresponding channel, and the transmitter 1820 transmits UL control information, data, and messages to the base station through a corresponding channel.

Figure 19:
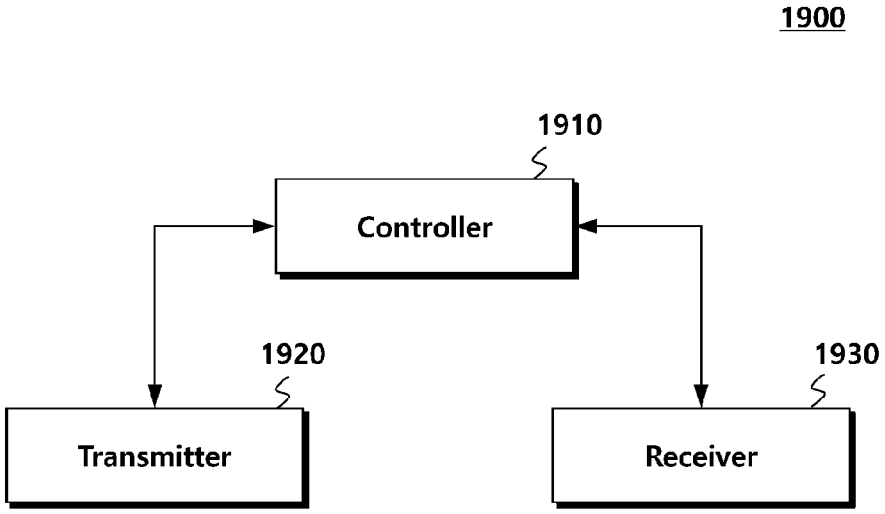
FIG. 19 is a block diagram illustrating a base station according to embodiments of the present disclosure.

FIG. 19 is a block diagram illustrating a base station according to embodiments of the present disclosure.

Referring to FIG. 19, a base station 1900 is provided for configuring carrier aggregation to a UE and receiving a buffer status report. The base station 1900 includes: a controller 1910 configured to generate information for configuring data duplicate transmission using the carrier aggregation, a transmitter 1920 configured to transmit high layer signaling including the information for configuring the data duplicate transmission using the carrier aggregation to the UE, and when the data duplicate transmission is activated, a receiver 1930 configured to receive the buffer status report configured by including PDCP data volume in both a logical channel group associated with the first RLC entity of the UE and a logical channel group associated with the second RLC entity of the UE.

For example, the information for configuring the duplicate transmission may include information on a plurality of RLC entities configured in a UE for transmitting data in duplicate, logical channel information associated with each RLC entity, information for associating each RLC entity with one PDCP entity, and MAC entity configuration information for the duplicate transmission.

The transmitter 1920 may transmit the information for configuring the duplicate transmission of the UE based on a single base station through high layer signaling, such as an RRC message.

As described above, the UE may receive the information for configuring the duplicate transmission, configure a plurality of RLC entities including a first RLC entity and a second RLC entity associated with one PDCP entity, and configure a logical channel associated with the first RLC entity and a logical channel associated with the second RLC entity to one MAC entity.

When the data duplicate transmission is activated for the UE, the receiver 1930 may receive, in duplicate, data transferred being associated with each logical channel of the UE through different carriers from each other. That is, the receiver 1930 may receive identical data in duplicate through different carriers from each other. Here, the different carriers from each other may be carriers configuring CA of the UE.

The buffer status report may include PDCP data volume for each logical channel group. To this end, the UE may include the PDCP data volume in both a logical channel group associated with the first RLC entity and a logical channel group associated with the second RLC entity, and then transmit the buffer status report including the PDCP data volume for each logical channel group to the base station. That is, when the buffer status report including the PDCP data volume is received, the PDCP data volume may be included in all logical channel groups associated with each RLC entity.

Meanwhile, the transmitter 1920 may transmit information for instructing data duplicate transmission of the UE to be activated through a MAC control element for each data radio bearer. For example, the signal for the activation of the duplicate transmission may be transmitted to the UE through a MAC control element for each data radio bearer.

In addition, the controller 1910 controls overall operations of the base station 1900 for transmitting/receiving identical data in duplicate through a plurality of carriers from the UE configured with CA based on a single base station, and receiving a corresponding buffer status report, according to performing embodiments described above. In addition, the transmitter 1920 and the receiver 1930 are configured to transmit or receive signals, messages, data required to perform embodiments described above to or from a UE.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A method of a user equipment configured with carrier aggregation for transmitting a buffer status report for single base station based data duplication transmission, the method comprising:

receiving, from a base station, high layer signaling including information for configuring the single base station based data duplicate transmission using carrier aggregation;

configuring a plurality of radio link control (RLC) entities including a first RLC entity and a second RLC entity associated with one packet data convergence protocol (PDCP) entity based on the high layer signaling, and configuring a logical channel associated with the first RLC entity and a logical channel associated with the second RLC entity to one medium access control (MAC) entity, wherein the first RLC entity and the second RLC entity of the user equipment are respectively and logically connected to corresponding RLC entities included in the base station; and

[when] *in response to* the data duplicate transmission [is] *being* activated, transmitting, to the base station, the buffer status report including PDCP data volume *representing the amount of available data for transmission* in [both] a logical channel group [associated with the first RLC entity and a logical channel group associated with] *within* the [second RLC] *PDCP* entity.

2. The method according to claim 1, wherein the one MAC entity transmits respective data transferred through the logical channel associated with the first RLC entity and the logical channel associated with the second RLC entity to the base station through different carriers from one another.

3. The method according to claim 1, wherein the activation of the data duplicate transmission is instructed by the base station through a MAC control element for each data radio bearer.

4. The method according to claim 1, wherein the first RLC entity and the second RLC entity are configured to be associated with different logical channels from each other based on a logical channel identifier.

5. The method according to claim 1, wherein a PDCP control PDU included in the PDCP data volume is included in only the logical channel group associated with the first RLC entity.

6. A method of a base station configuring carrier aggregation for a buffer status report for single base station based data duplication transmission, the method comprising:

generating information for configuring the single base station based data duplicate transmission using the carrier aggregation; transmitting, to a user equipment, high layer signaling including the information for configuring the single base station based data duplicate transmission using the carrier aggregation; and

[when] *in response to* the data duplicate transmission [is] *being* activated, receiving the buffer status report including packet data convergence protocol (PDCP) data volume [of the user equipment] *representing the amount of available data for transmission* in [both] a logical channel group [associated with a first radio link control (RLC) entity of the user equipment and a logical channel group associated with a second RLC] *within the PDCP* entity[of the user equipment], where the first RLC entity and the second RLC entity of the user equipment are respectively and logically connected to RLC entities included in the base station.

7. The method according to claim 6, wherein the information for configuring the data duplicate transmission is configured by associating of the user equipment the first RLC entity and the second RLC entity with one PDCP entity and includes information for configuring the logical channel associated with the first RLC entity and the logical channel associated with the second RLC entity to one medium access control (MAC) entity configured in the user equipment.

8. The method according to claim 7, wherein the first RLC entity and the second RLC entity are configured to be associated with different logical channels from each other based on a logical channel identifier.

9. The method according to claim 6, wherein a PDCP control PDU included in the PDCP data volume is included in only the logical channel group associated with the first RLC entity.

10. The method according to claim 6, further comprising: before the buffer status report is received, transmitting information for instructing the data duplicate transmission of the user equipment to be activated through a MAC control element for each data radio bearer.

11. The method according to claim 6, wherein the base station receives respective data transferred through the logical channel associated with the first RLC entity and the logical channel associated with the second RLC entity through different carriers from one another.

12. A user equipment configured with carrier aggregation for transmitting a buffer status report for single base station based data duplication transmission, the user equipment comprising:

a receiver configured to receive, from a base station, high layer signaling including information for configuring the single base station based data duplicate transmission using carrier aggregation;

a controller configured to configure a plurality of RLC entities including a first radio link control (RLC) entity and a second RLC entity associated with one packet data convergence protocol (PDCP) entity based on the high layer signaling, and configure a logical channel associated with the first RLC entity and a logical channel associated with the second RLC entity to one medium access control (MAC) entity, wherein the first RLC entity and the second RLC entity of the user equipment are respectively and logically connected to corresponding RLC entities included in the base station; and a transmitter is configured to transmit, to the base station, the buffer status report including PDCP data volume *representing the amount of available data for transmission* in [both] a logical channel group [associated with the first RLC entity and a logical channel group associated with] *within* the [second RLC] *PDCP* entity [when] *in response to* the data duplicate transmission [is] *being* activated.

13. The user equipment according to claim 12, wherein the one MAC entity transmits respective data transferred through the logical channel associated with the first RLC entity and the logical channel associated with the second RLC entity to the base station through different carriers from one another.

14. The user equipment according to claim 12, wherein the activation of the data duplicate transmission is instructed by the base station through a MAC control element for each data radio bearer.

15. The user equipment according to claim 12, wherein a PDCP control PDU included in the PDCP data volume is included in only the logical channel group associated with the first RLC entity.

16. The user equipment according to claim 12, wherein the first RLC entity and the second RLC entity are configured to be associated with the one PDCP entity based on a logical channel identifier.

*17. A base station for configuring carrier aggregation for a buffer status report for single base station based data duplication transmission, the base station comprising:*

*a transmitter for generating information for configuring the single base station based data duplicate transmission using the carrier aggregation; transmitting, to a user equipment, high layer signaling including the information for configuring the single base station based data duplicate transmission using the carrier aggregation; and*

*a receiver for receiving the buffer status report including packet data convergence protocol (PDCP) data volume representing the amount of available data for transmission in a logical channel group within the PDCP entity, where the first RLC entity and the second RLC entity of the user equipment are respectively and logically connected to RLC entities included in the base station.*

* * * * *